US012675459B2

(12) United States Patent
Chen et al.

(10) Patent No.: US 12,675,459 B2
(45) Date of Patent: Jul. 7, 2026

(54) AUTOMATIC EVOLUTION OF DYNAMIC TABLES BASED ON OBJECT TRACKING

(71) Applicant: Snowflake Inc., Bozeman, MT (US)

(72) Inventors: Hung-An Chen, Seattle, WA (US); Arvid Heise, Michendorf (DE); Daniel Mills, Seattle, WA (US); Duc Tien Nguyen, Munich (DE); Leon Papke, Berlin (DE); Attila-Péter Tóth, Bellevue, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/677,681

(22) Filed: May 29, 2024

(65) Prior Publication Data

US 2025/0370979 A1 Dec. 4, 2025

(51) Int. Cl.
*G06F 16/22* (2019.01)
*G06F 16/2455* (2019.01)

(52) U.S. Cl.
CPC ........ *G06F 16/2282* (2019.01); *G06F 16/221* (2019.01); *G06F 16/2455* (2019.01)

(58) Field of Classification Search
None
See application file for complete search history.

(56) References Cited

U.S. PATENT DOCUMENTS

| | | | | |
|---|---|---|---|---|
| 10,120,899 B2 * | 11/2018 | Ding | .................. | G06F 16/2393 |
| 11,755,568 B1 * | 9/2023 | Akidau | ............. | G06F 16/24539 |
| | | | | 707/717 |
| 2008/0097962 A1 * | 4/2008 | Santosuosso | ..... | G06F 16/24539 |
| 2023/0195744 A1 * | 6/2023 | Owen | .................. | G06F 16/283 |
| | | | | 707/602 |
| 2023/0401199 A1 * | 12/2023 | Akidau | ............. | G06F 11/3419 |
| 2025/0328545 A1 * | 10/2025 | Heise | ................. | G06F 16/2282 |

OTHER PUBLICATIONS

Zhou, Jingren, Per-ke Larson, and Jonathan Goldstein. "Partially materialized views." In submitted to this conference. 2005. (Year: 2005).*
Corwin, John, Perry Miller, Avi Silberschatz, and Luis Marenco. "Dynamic Tables: An Architecture for Managing Evolving, Heterogeneous Data in Relational Database Management Systems." (2006). (Year: 2006).*

* cited by examiner

*Primary Examiner* — Uyen T Le
(74) *Attorney, Agent, or Firm* — Schwegman Lundberg & Woessner, P.A.

(57) ABSTRACT

Provided herein are systems and methods for configuring automatic evolution of dynamic tables. An example method includes parsing, by at least one hardware processor, a query associated with a dynamic table to determine a current base object dependency of the dynamic table on at least a first base object. A prior base object dependency of the dynamic table on at least a second base object is retrieved. A delta between data stored by the at least first base object and data stored by the at least second base object is determined. The dynamic table is updated based on the delta.

30 Claims, 27 Drawing Sheets

VIEW GRAPH

500

1500

CREATE DYNAMIC TABLE STAR
AS SELECT * FROM $t_0$ ...

dt$_{STAR}$ $t_0$

ADD COLUMN
DROP COLUMN
RENAME COLUMN ...

1600

1700

2600

PARSE A QUERY ASSOCIATED WITH A DYNAMIC TABLE TO DETERMINE INVOLVED (CURRENT) BASE OBJECTS — 2602

RETRIEVE PRIOR BASE OBJECT DEPENDENCIES OF THE DYNAMIC TABLE OF THE LAST REFRESH — 2604

DETERMINE A DELTA BETWEEN BASE OBJECTS OF THE LAST REFRESH AND THE CURRENT BASE OBJECTS — 2606

UPDATE THE DYNAMIC TABLE BASED ON THE DELTA — 2608

AUTOMATIC EVOLUTION OF DYNAMIC TABLES BASED ON OBJECT TRACKING

TECHNICAL FIELD

Embodiments of the disclosure generally relate to databases and, more specifically, to a database object type (e.g., a dynamic table (DT)) and the automatic evolution of DTs based on object tracking.

BACKGROUND

Databases are widely used for data storage and access in computing applications. A goal of database storage is to provide enormous sums of information in an organized manner so that it can be accessed, managed, updated, and shared. Data may be organized into rows, columns, and tables in a database. Different database storage systems may be used to store different types of content, such as bibliographic, full text, numeric, and image content. Further, in computing, different database systems may be classified according to the organizational approach of the database. There are many different types of databases, including relational, distributed, cloud, object-oriented, and others.

Databases may include one or more tables that include or reference data that can be joined, read, modified, or deleted using queries. Databases can store small or large sets of data within one or more tables. This data can be accessed by various users in an organization or even be used to service public users, such as via a website or an application programming interface (API). Both computing and storage resources and their underlying architecture can play a significant role in achieving desirable database performance, including facilitating access to different types of data. However, data processing, including the processing of files, can be associated with inefficient workload distribution, high latency, and inefficient allocation of compute resources. Additionally, the configuration of queries, consuming changes to queries, and performing refreshes of database tables associated with the queries may be challenging and time-consuming.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
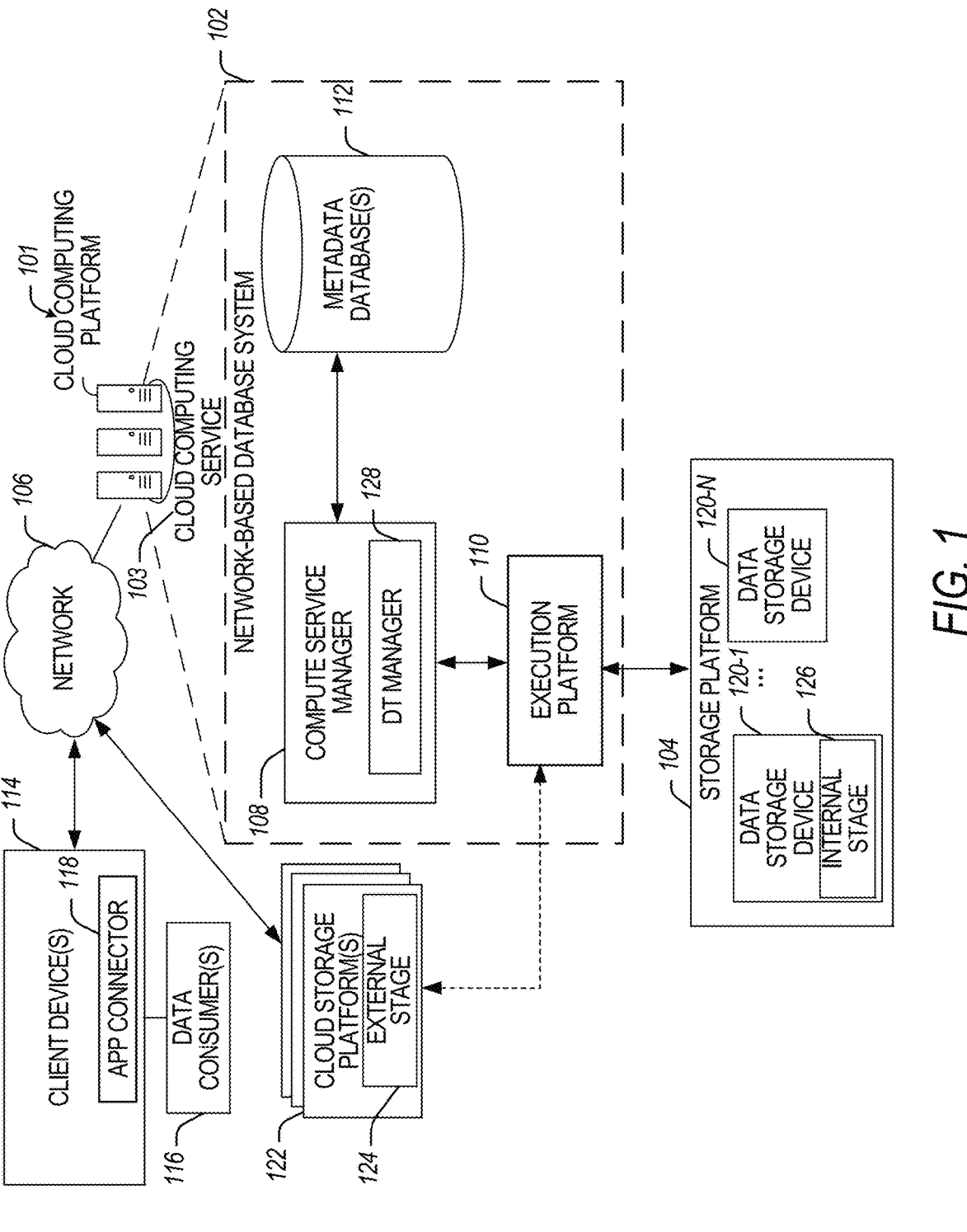
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In the present disclosure, physical units of data that are stored in a data platform—and that make up the content of, e.g., database tables in customer accounts—are referred to as micro-partitions. In different implementations, a data platform may store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internally in the data platform, a given file is referred to herein as an "internal file" and may be stored in (or at, or on, etc.) what is referred to herein as an "internal storage location." If stored externally to the data platform, a given file is referred to herein as an "external file" and is referred to as being stored in (or at, or on, etc.) what is referred to herein as an "external storage location." These terms are further discussed below.

Computer-readable files come in several varieties, including unstructured files, semi-structured files, and structured files. These terms may mean different things to different people. As used herein, examples of unstructured files include image files, video files, PDFs, audio files, and the like; examples of semi-structured files include JavaScript Object Notation (JSON) files, extensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semi-conductor-testing data, and HDF5 files are often used in industries such as the aeronautics industry, in that case for storing data such as aircraft-emissions data. Numerous other examples of unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

As used herein, the term "table" indicates mutable rows supporting time travel up to a retention period.

As used herein, the term "view" indicates a named SELECT statement, conceptually similar to a table. In some aspects, a view can be secure, which prevents queries from obliquely getting information on the underlying data.

As used herein, the term "materialized view" indicates a view that is eagerly computed rather than lazily (e.g., as a standard view). In some aspects, efficient implementation of materialized views overlaps with change tracking functionality.

As used herein, the term "CHANGES clause" indicates a syntactic modifier on a FROM clause indicating that a SELECT statement should return the changes that occurred to the specified table between two given times (docs). In some aspects, several different change types can be requested:

(a) the default type (also referred to as delta) finds the smallest set of changes that could account for the difference between the tables at the given times;

(b) the append-only type only finds rows that were appended to the table; and (c) the audit type computes all changes made between the given times, even if they cancel out.

In some aspects, dynamic tables can be used to improve functionalities provided by tasks and materialized views (MVs). As used herein, the term "dynamic table" (or DT) indicates data that is the result of a query, which can be periodically updated and queried. Tasks are powerful, but the conceptual model may limit their usability. Most use cases for tasks can be satisfied with tasks combined with stored procedures, streams, data manipulation language (DML), and transactions. Streams on views can be used to facilitate stateless incremental computations. Some drawbacks associated with tasks (which can be successfully addressed with DTs) include the following: (a) backfill workflows must be implemented and orchestrated manually, and (b) stateful operators (GroupBy, outer joins, windows) cannot be cleanly incremented by streams. As used herein, the terms "dynamic table" (or DT) and "materialized table" (or MT) are used interchangeably.

In some aspects, a DT can be created using a table definition that includes a query and a lag duration value. The lag duration value can indicate the maximum time period that a result of a prior query refresh lags behind a current time instance.

As used herein, the term "base object" indicates a data object that a dynamic table can depend on (e.g., a query associated with the dynamic table is applied to such base object). Example base objects include a base table, a base view, and a base function (e.g., a base user-defined function or UDF).

As used herein, the term "delta" indicates a difference between data objects or corresponding portions/parts of different versions of the same data object. In this regard, the delta can be data representative of the difference.

In some aspects, MVs can be used as query accelerators. Simple queries may be sufficient, and only aggregating operations are supported (e.g., no joins and no nested views are supported). Additionally, implementation costs may be insignificant, and users may be exposed to less visibility and control.

In some aspects, DTs can be used to target data engineering use cases. While MVs can support only aggregating operations (e.g., a single GroupBy on a single table), DTs remove query limitations and allow joining and nesting in addition to aggregation. Additional benefits of DTs include providing controls over cost and table refresh operations, automating common operations, including incrementalization and backfill, and providing a comprehensive operational experience.

In comparison to other query processing techniques (e.g., extract-transform-load (ETL) and data pipeline solutions such as Airflow, Data Build Tool (DBT), streams, and tasks), the disclosed techniques are associated with the following additional advantages of using DTs: providing a declarative structured query language (SQL) interface to facilitate specifying the pipelines compared to preceding solutions; refreshes are performed incrementally (i.e., the cost scales with the size of the changes to inputs), reducing the cost compared to a "full refresh" solutions like the DBT development framework; incrementalization is done automatically, which results in simplifying the queries users have to write compared to traditional ETL systems like Airflow; DTs are integrated with the database, making it easier to access source data; and DTs are similar to MVs, but targeted at the use case of building data pipelines, not accelerating interactive query workloads (compared to MVs, DTs impose fewer restrictions on allowed queries, but cannot be automatically substituted into queries like MVs).

Aspects of the present disclosure provide techniques for configuring database object types (e.g., a dynamic table) and performing base object tracking for the automatic evolution of dynamic tables. For example, the disclosed techniques may be performed by a DT manager in a network-based database system. In some embodiments, the DT manager can perform automatic evolution as part of an incremental refresh of a dynamic table. Old data (e.g., data in the DT prior to evolution) can be made available for querying before the DT evolution (which allows for zero downtime).

At each refresh, the automatic evolution functionality configured by the DT manager can be used to determine the base objects used by the DT that may influence the content or schema of the result. For example, the DT manager can determine directly and indirectly referenced (by the DT) regular and dynamic tables and their columns, directly and indirectly referenced (by the DT) views, involved user-defined functions (also referred to as base functions, base user-defined functions, or base UDFs), as well as any other data that influences data masking (e.g., data governance functions used in the base tables and the owner role of the dynamic table if the role is used for data masking). These dependencies can be persisted during a refresh and then compared with the dependencies of the next refresh to determine a delta. For more significant changes, such as replaced base tables/views/functions, the DT manager can perform a full reinitialization. The DT manager can perform automatic evolution of the dynamic table by updating the dynamic table based on the determined delta, in lieu of performing a reinitialization of the table.

However, if a user recreates the dynamic table, it can be a costly process, and engineering time is inefficiently used. In some aspects, the DT manager does not perform reinitialization in the following cases: a column has been added to a base table but is not referenced, and a column has been removed from a base table but is not referenced. In some aspects, the DT manager can automatically widen the type of columns used in the DT in the following cases: base object columns are widened, a base view definition is changed (which results in wider types), user-defined functions are replaced (which returns widened types), and masked columns on the base tables result in wider types.

The various embodiments that are described herein are described with reference, where appropriate, to one or more of the various figures. An example computing environment using a DT manager to configure the evolution of DTs is discussed in connection with FIGS. 1-3. Example configuration and functions associated with the DT manager and DT evolution are discussed in connection with FIGS. 4-26. A more detailed discussion of example computing devices that may be used in connection with the disclosed techniques is provided in connection with FIG. 27.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not explicitly described herein. In other embodiments, the computing environment may comprise another type of network-based database system or a cloud data platform. For example, in some aspects, the computing environment 100 may include a cloud computing platform 101 with the network-based database system 102, storage platforms 104, and cloud storage platforms 122. The cloud computing platform 101 provides computing resources and storage resources that may be acquired (purchased) or leased (e.g., by data providers and data consumers), and configured to execute applications and store data.

The cloud computing platform 101 may host a cloud computing service 103 that facilitates storage of data on the cloud computing platform 101 (e.g., data management and access) and analysis functions (e.g., SQL queries, analysis), as well as other processing capabilities (e.g., performing the DT-related functions described herein). The cloud computing platform 101 may include a three-tier architecture: data storage (e.g., storage platforms 104 and 122), an execution platform 110, and a compute service manager 108 providing cloud services (e.g., services associated with performing automatic evolution of DTs using the DT manager 128).

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform, which is referred to herein as an internal storage location concerning the data platform.

From the perspective of the network-based database system 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 101 is in communication with the cloud storage platforms 104 and 122 (e.g., AWS®, Microsoft Azure Blob Storage®, or Google Cloud Storage), client device 114 (e.g., a data provider), and data consumer 116 via network 106. The network-based database system 102 is a network-based system used for reporting and analysis of integrated data from one or more disparate sources, including one or more storage locations within the cloud storage platform 104. The storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services (as well as additional services such as the disclosed functions associated with automatic evolution of DTs) to multiple client accounts, including an account of the data provider associated with client device 114 and an account of the data consumer 116. In some embodiments, the compute service manager 108 comprises the DT manager 128, which can be used in connection with the disclosed DT-related functions. Example DT-related functions include configuring the automatic evolution of DTs. A more detailed description of the functions provided by the DT manager 128 is provided in connection with FIGS. 4-26.

The compute service manager 108 coordinates and manages operations of the network-based database system 102. The compute service manager 108 also performs query optimization and compilation and manages clusters of computing services that provide compute resources (also referred to as "virtual warehouses"). The compute service manager 108 can support any number of client accounts, such as end-users providing data storage and retrieval requests, accounts of data providers, accounts of data consumers, system administrators managing the systems and methods described herein, and other components/devices that interact with the compute service manager 108.

The compute service manager 108 is also in communication with a client device 114. The client device 114 corresponds to a user of one of the multiple client accounts (e.g., a data provider) supported by the network-based database system 102. The data provider may utilize application connector 118 at the client device 114 to submit data storage, retrieval, and analysis requests to the compute service manager 108 as well as to access or configure other services provided by the compute service manager 108 (e.g., services associated with the disclosed DT-related functions).

Client device 114 (also referred to as user device 114) may include one or more of a laptop computer, a desktop computer, a mobile phone (e.g., a smartphone), a tablet computer, a cloud-hosted computer, cloud-hosted serverless processes, or other computing processes or devices may be used to access services provided by the cloud computing platform 101 (e.g., cloud computing service 103) by way of a network 106, such as the Internet or a private network.

In the description below, actions are ascribed to users, particularly consumers and providers. Such actions shall be understood to be performed concerning client device (or devices) 114 operated by such users. For example, a notification to a user may be understood to be a notification transmitted to the client device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user (consumer or provider) shall be understood to include performing such actions by the cloud computing service 103 in response to an instruction from that user.

In some aspects, a data consumer 116 can communicate with the client device 114 to access functions offered by the data provider. Additionally, the data consumer can access functions (e.g., the disclosed DT-related functions) offered by the network-based database system 102 via network 106.

The compute service manager 108 is also coupled to one or more metadata databases 112 that store metadata about various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

The compute service manager 108 is further coupled to the execution platform 110, which provides multiple computing resources (e.g., execution nodes) that execute, for example, various data storage, data retrieval, and data processing tasks. The execution platform 110 is coupled to storage platform 104 and at least one cloud storage platform 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data storage technology. Additionally, the cloud storage platform 104 may include distributed file systems (such as Hadoop Distributed File Systems (HDFS)), object storage systems, and the like. In some embodiments, at least one internal stage 126 may reside on one or more of the data storage devices 120-1-120-N, and at least one external stage 124 may reside on the at least one cloud storage platform 122.

In some embodiments, communication links between elements of the computing environment 100 are implemented via one or more data communication networks, such as network 106. The one or more data communication networks may utilize any communication protocol and any communication medium. In some embodiments, the data communication networks are a combination of two or more data communication networks (or sub-networks) coupled with one another. In alternate embodiments, these communication links are implemented using any communication medium and any communication protocol.

The compute service manager 108, metadata database 112, execution platform 110, and storage platform 104 are shown in FIG. 1 as individual discrete components. However, each of the compute service manager 108, metadata database 112, execution platform 110, and storage platforms 104 and 122 may be implemented as a distributed system (e.g., distributed across multiple systems/platforms at multiple geographic locations). Additionally, each of the compute service manager 108, metadata database(s) 112, execution platform 110, and storage platforms 104 and 122 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operations, the network-based database system 102 processes multiple jobs as determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from and store data to any of the data storage resources in the cloud storage platform 104.

Figure 2:
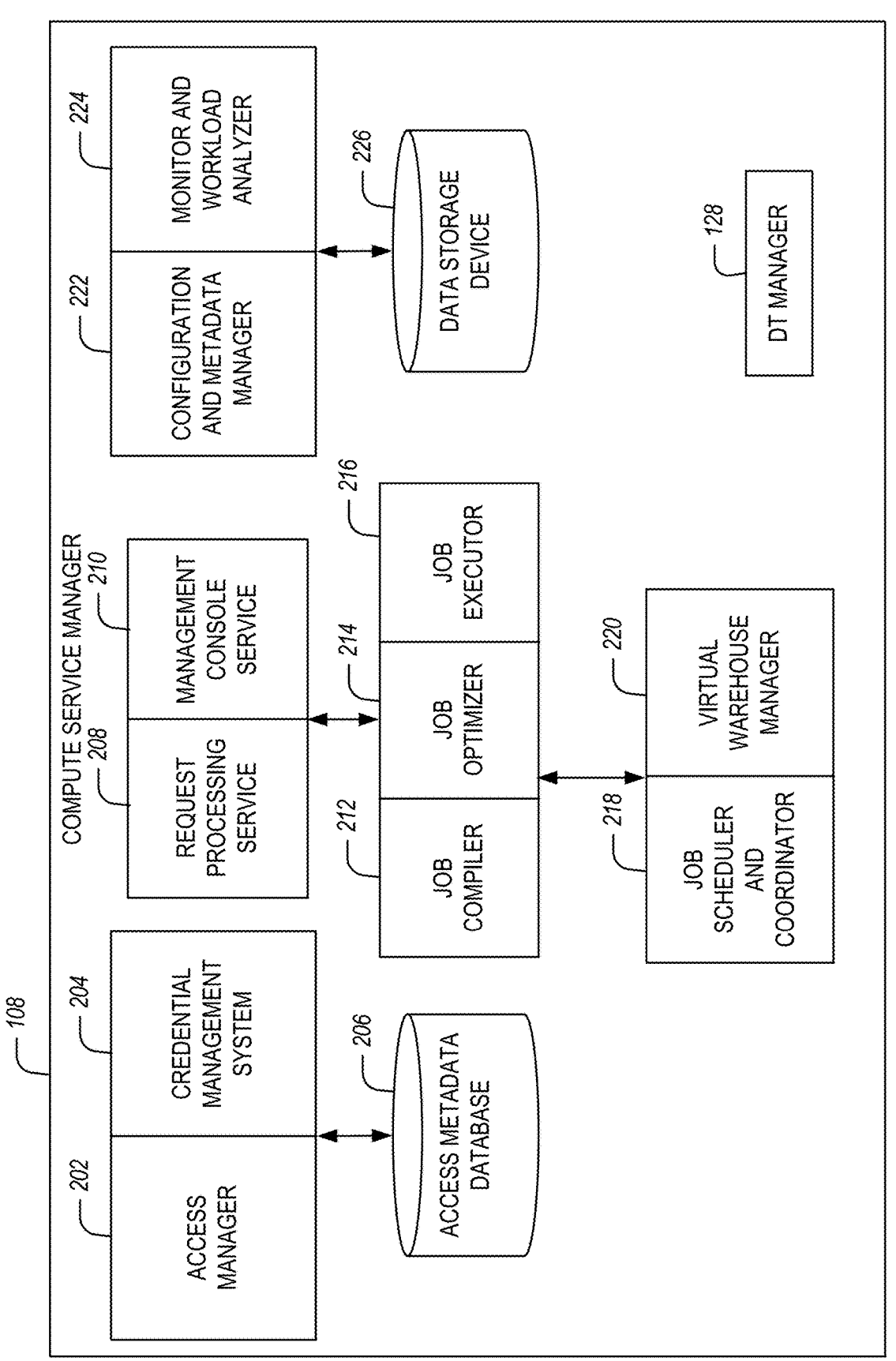
FIG. 2 is a block diagram illustrating the components of a compute service manager using a DT manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates the use of remotely stored credentials to access external resources, such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and the local buffers (e.g., the buffers in the execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing query A should not be allowed to request access to data source D (e.g., data storage device 226) that is not relevant to query A. Similarly, a given execution node (e.g., execution node 302-1 may need to communicate with another execution node (e.g., execution node 302-2) and should be disallowed from communicating with a third execution node (e.g., execution node 312-1) and any such illicit communication can be recorded (e.g., in a log or other location). Also, the information stored on a given execution node is restricted to data relevant to the current query, and any other data is unusable, rendered so by destruction or encryption where the key is unavailable.

In some embodiments, the compute service manager 108 further includes the DT manager 128, which can be used in connection with DT-related functions disclosed herein, such as the automatic evolution of DTs.

Figure 3:
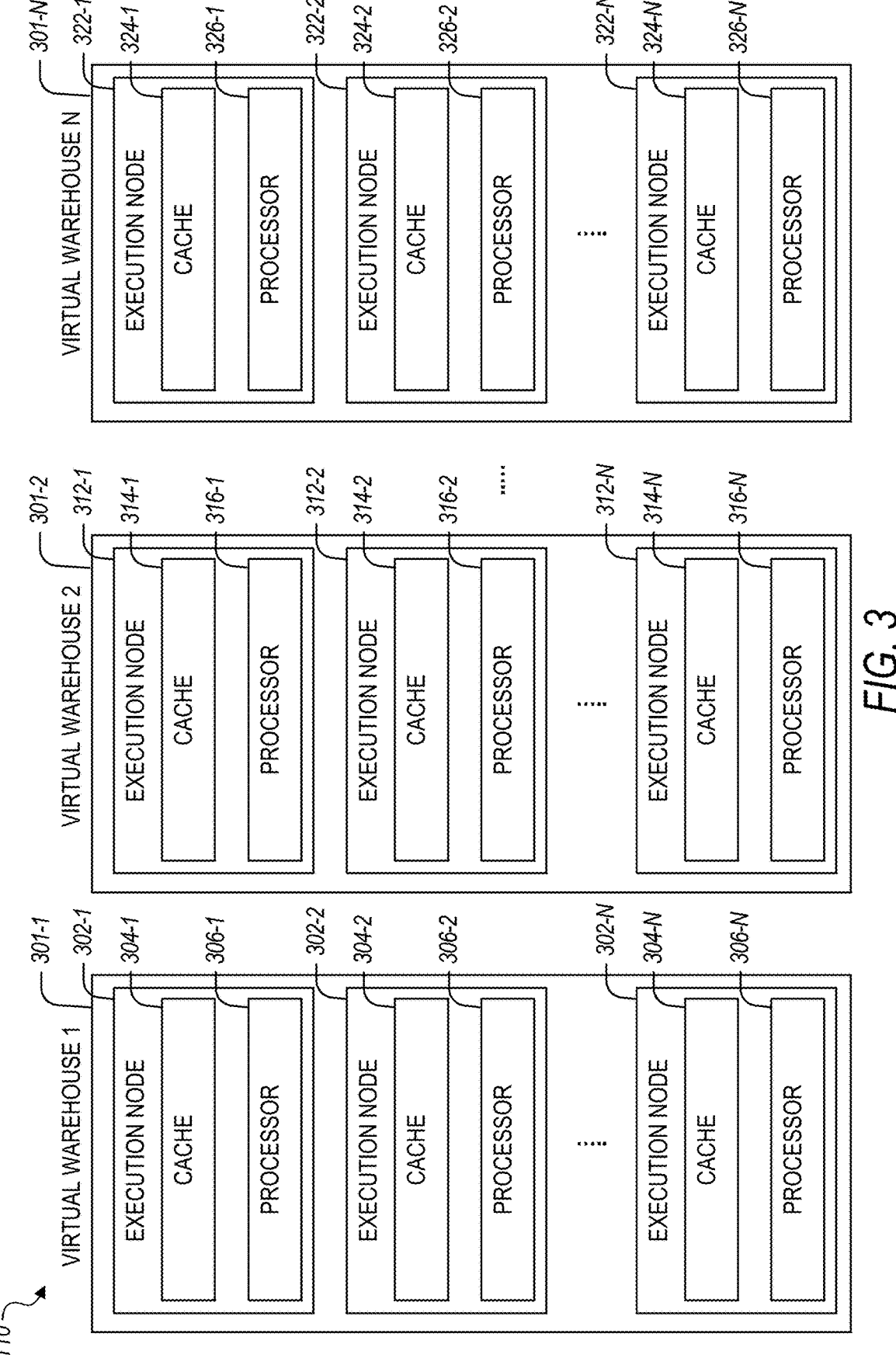
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic. New execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device. Still, the virtual warehouse or execution node may later access data from any other data storage device.

In the example of FIG. 3, virtual warehouse 1 includes three execution nodes: 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes: 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes: 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor; alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes. This is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, which is helpful for tasks that require fast scanning of large amounts of data. In some embodiments, the cache resources and computing resources associated with a particular execution node are determined when the execution node is created based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, virtual warehouses 1, . . . , N may be implemented using multiple computing systems at multiple geographic locations. For example, virtual warehouse 1 can be implemented by a computing system at a first geographic location, while another computing system implements virtual warehouses 2 and n at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, it is replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the cloud storage platform 104. Still, each virtual warehouse has its execution nodes with independent processing and caching resources. This configuration allows requests on different virtual warehouses to be processed independently and with no interference between the requests. This independent processing, combined with the ability to add and remove virtual warehouses dynamically, supports the addition of new processing capacity for new users without impacting the performance observed by the existing users.

In some aspects, DTs can be configured with the following capabilities:

(a) Incremental refresh: selection, projections (scalar functions), aggregations, and joins (inner, outer, semi, anti). In some aspects, DTs are refreshed incrementally (e.g., when the DTs contain the above-listed operations).

(b) Observability: In some aspects, a user interface (UI) with a simple view graph and account usage views can be used for monitoring.

(c) DT definition evolution can be used to configure a full refresh. In some aspects, DTs can continue functioning when they are replaced. However, updating may be based on a full (non-incremental) refresh. If consuming DTs are broken, updates may pause, and an error may be generated.

(d) Shared data: In some aspects, DTs can read shared tables and views and share them themselves.

(e) Data transformation tool (e.g., DBT) integration: a custom DBT materialization for users can be used to adopt DTs in data transformation pipelines.

In some aspects, the disclosed techniques can be used to create DTs with the following configurations: minimum lag of 1 second; nesting depth, fan-in, and fan-out of up to 1000; incremental refreshes for partitioned window functions, subqueries, lateral joins, and recursive queries; integration with other data processing features including streams, row access policies, column masking policies, external tables, directory tables, external functions, user-defined functions (UDFs), and user-defined table functions (UDTFs); support for non-deterministic functions; an interactive UI for monitoring and debugging DT pipelines; incremental DT definition evolution when queries change compatibility; automatic query rewrites into DT scans; stream-like, "append-only" transformations; continuous DML features; merge performance optimizations; and using DTs to implement other features within a network-based database system including functionalities for automatic evolution of DTs.

In some aspects, DTs can be defined and orchestrated using data definition language (DDL) commands. For example, a DT can be created using the command CREATE DYNAMIC TABLE <name> [LAG=<duration>] AS <query>. In this regard, a DT can be created using a query on one or more base tables and a lag duration (also referred to as a lag or a lag duration value). The lag duration value indicates a maximum period that a result of a prior refresh of the query can lag behind a current real-time instance (e.g., a current time, which can also be referred to as a current time instance). The lag duration value can be configured as a required parameter.

In some aspects, the DDL command ALTER DYNAMIC TABLE <name> {SUSPEND|RESUME} can be used to suspend or resume a refresh (e.g., to prevent refreshes without deleting DTs entirely).

In some aspects, the DDL command ALTER DYNAMIC TABLE <name> REFRESH can be used for the manual orchestration of data pipelines. In some aspects, the DDL command SHOW DYNAMIC TABLES can be similar to the command SHOW DYNAMIC VIEWS (or SHOW MATERIALIZED VIEWS), but with additional columns to show, e.g., lag, base tables, and maintenance plan. In some aspects, when the lag duration is set to infinity, the ALTER command can be used for a manual refresh.

In some aspects, the following DDL command configurations can be used with the disclosed DT-related techniques.

The following syntax may be used with the CREATE command for creating DTs: CREATE [OR REPLACE] DYNAMIC TABLE <name> (<column_list>) [LAG=<duration>] AS <select>. LAG represents a lag duration that the table is allowed to be behind relative to the current time. The term <select> indicates the view definition and may include a selection of both tables, views, projections (scalar functions), aggregates, joins (inner, outer, semi, anti), etc. This definition can be richer than an MV view definition.

In some aspects, if LAG is not specified and the user provides a view definition that is not compatible with the current implementation, then an informative error is generated that will point to a document that details what is allowed/not-allowed. Examples of this include a selection on an MV (selects from materialized tables can be allowed, but not classic MVs). Similar to existing MVs, creation requires CREATE DYNAMIC TABLE privilege on the schema and SELECT privileges on the base tables and sources.

The following configurations may be used with the ALTER command. The command can be configured as ALTER DYNAMIC TABLE <name> {SUSPEND |RESUME}. This command allows the user to stop the DT from updating itself via its refresh strategy. A DT can remain suspended until a RESUME is executed.

In some aspects, the command ALTER DYNAMIC TABLE <name> set LAG=<duration> can be used to change the lag of the materialized table. The subsequent scheduled execution of the refresh can reflect the updated lag.

In some aspects, the command ALTER DYNAMIC TABLE <name> REFRESH [AT (<at_spec>)] can be used to initiate an immediate refresh of the DT. This command may be used with data engineering use cases that may require more direct control over refreshes. For example, it may be common for imperative data pipelines to spend a significant amount of time in an inconsistent state, with new data only partially loaded. Authors of such pipelines would not want a refresh to occur during these inconsistent periods, and they may disable automatic refresh (LAG='infinity') and invoke REFRESH when they know the database is in a consistent state.

In some aspects, the optional AT clause can be used to allow users to control the transactional time from which the DT's source data is read. Using this, they can ensure that multiple manually-orchestrated DTs are aligned correctly, even during backfills.

In some aspects, commands ALTER DYNAMIC TABLE <name> set REFRESH_MODE={INCREMENTAL|FULL|AUTO} and ALTER DYNAMIC TABLE <name> unset REFRESH_MODE can be used to change the refresh mode on the DT. The change can be reflected in the next reprocessing of the DT. Unset sets the refresh mode back to the system default. The INCREMENTAL value may be used to maintain the DT by processing changes to the source(s) incrementally. The FULL value may be used to perform a full refresh of the DT (i.e., an entire re-computation). The AUTO value indicates that the network-based database system can determine whether to perform an incremental or full refresh, any may alternate between the two depending on upstream changes and the view definition.

In some aspects, the DROP DYNAMIC TABLE <name> command can be configured.

In some aspects, SHOW DYNAMIC TABLES [LIKE '<pattern>'] [IN {ACCOUNT|DATABASE [<db_name>] | [SCHEMA] [<schema_name>]}] command can be configured. The existing syntax can be kept, but the following columns can be added to the existing output:

(a) lag: the user-defined lag duration specified during creation. Unlike the existing columns, this configuration can be static.

(b) source_names: a column that has the fully qualified names of the sources used in the DT as a list, ex. ["db". "schema". "table"]. For a longer term, source_database_name, source_schema_name, and source_table_name can be deprecated in favor of this new column as these will be null for DTs.

In some aspects, the following variants of the EXPLAIN command may be used in connection with the disclosed DT-related functionalities (e.g., to obtain details of an operation on a DT):

(a) EXPLAIN CREATE DYNAMIC TABLE <mv> LAG=<duration> AS<query> can be used to show the refresh plan before creating a DT.

(b) EXPLAIN ALTER DYNAMIC TABLE <mv> REFRESH [AT (<at_spec>)] can be used to show the refresh plan for a DT.

(c) EXPLAIN SELECT <select> FROM <mv> can be used to show the version and plan used to resolve the DT.

In some aspects, a stream on a DT can be created, similarly to a stream on a view (which is discussed in connection with FIG. 8-FIG. 12).

Figure 4:
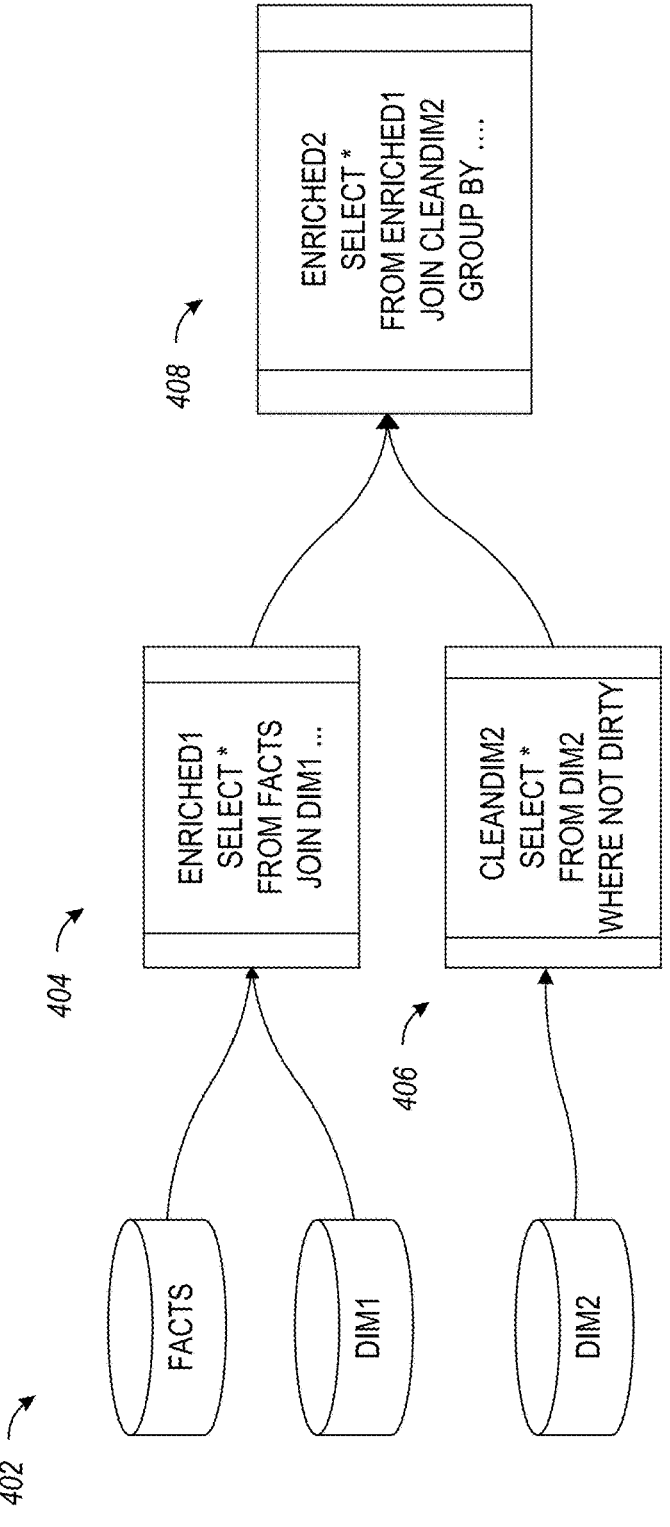
FIG. 4 is a diagram illustrating an example data enrichment pipeline using dynamic tables, in accordance with some embodiments of the present disclosure.

FIG. 4 is diagram 400 illustrating an example data enrichment pipeline using DTs, in accordance with some embodiments of the present disclosure.

In some aspects, DT definitions are rendered into a dependency graph, where each node in the graph is a DT query, edges indicate that one DT depends on the results of another, leaf nodes are DTs on base tables, and DDLs (e.g., DDL commands) can be used to log graph changes to a metadata database (e.g., metadata database 112), and an in-memory representation of the graph can be rendered.

Referring to FIG. 4, DT Enriched1 404 is created using a subset of base tables 402, namely, base tables Facts and Dim1. DT CleanDim2 406 is created using base table Dim2 of base tables 402. DT Enriched2 408 is created from DTs Enriched1 and CleanDim2. In this regard, the following processing sequence can be used: (a) a DT is created using other DTs; (b) the DTs (e.g., the DTs 404-408 in FIG. 4)

form an acyclic dependency graph (e.g., a directed acyclic graph or DAG); a query in the final DT (e.g., DT Enriched2 408) is parsed to obtain two or more dependent DTs (e.g., DTs Enriched1 404 and CleanDim2 406); and DT refreshes can be scheduled based on the configurations of each DT.

In some aspects, DT refreshes can be scheduled at aligned time instances (or ticks) for consistency. In some aspects, DTs can be joined at consistent times without fine-grained refreshes. A user can provide a lag duration (or lag) target, and refreshes can be scheduled to meet that target. For example, a set of canonical refresh times (e.g., ticks) is selected, which align refreshes at different frequencies. In some aspects, the ticks can be determined based on the following equation: ticks=$\{UnixEpoch+48$ seconds$*2^{f}*n\}$, where f is the frequency level, and n is the refresh instance. In some aspects, refreshes can be scheduled at the nearest tick that meets the user's lag target. Common examples of lag targets and tick periods are provided in Table 1 below:

TABLE 1

| Target Lag | 1 min | 5 min | 15 min | 1 hr | 25 hr |
|---|---|---|---|---|---|
| Tick Period | 48 sec | 3.2 min | 12.8 min | 51 min | 13.6 hr |

Using the above techniques can yield alignment at two scopes: account-wide (DTs can be joined with snapshot isolation) and deployment-wide (DTs can be joined with read-committed isolation).

Figure 5:
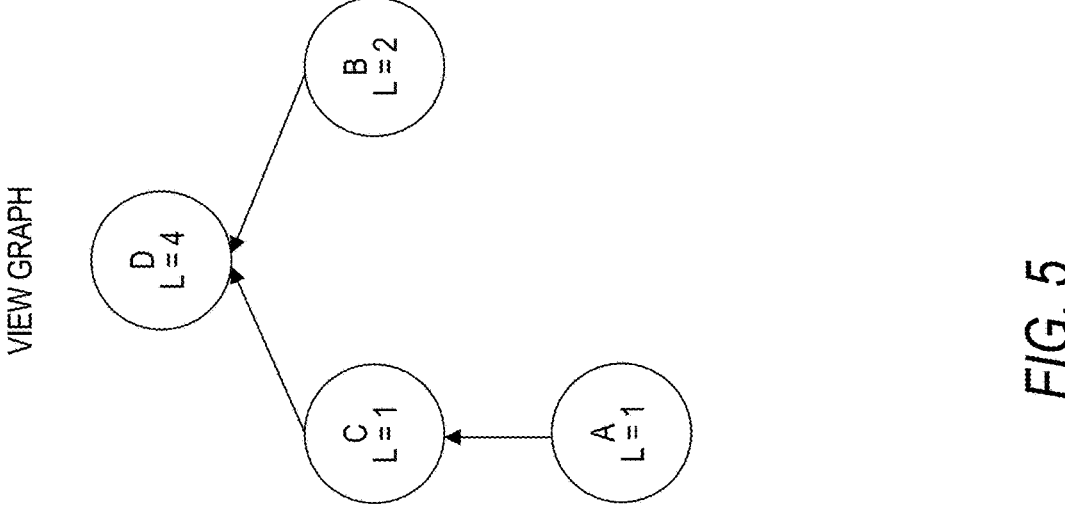
FIG. 5 is a diagram of a view graph of DTs associated with different lag targets, in accordance with some embodiments of the present disclosure.

FIG. 5 is a diagram of a view graph 500 of DTs associated with different lag targets, in accordance with some embodiments of the present disclosure. Referring to FIG. 5, graph 500 is associated with a dependency relationship between DTs with different lag durations (indicated as L). For example, DT A (with lag duration L=1) feeds to DT C (with L=1). DT D (with L=4) uses data from DT C (L=1) and DT B (L=2).

Figure 6:
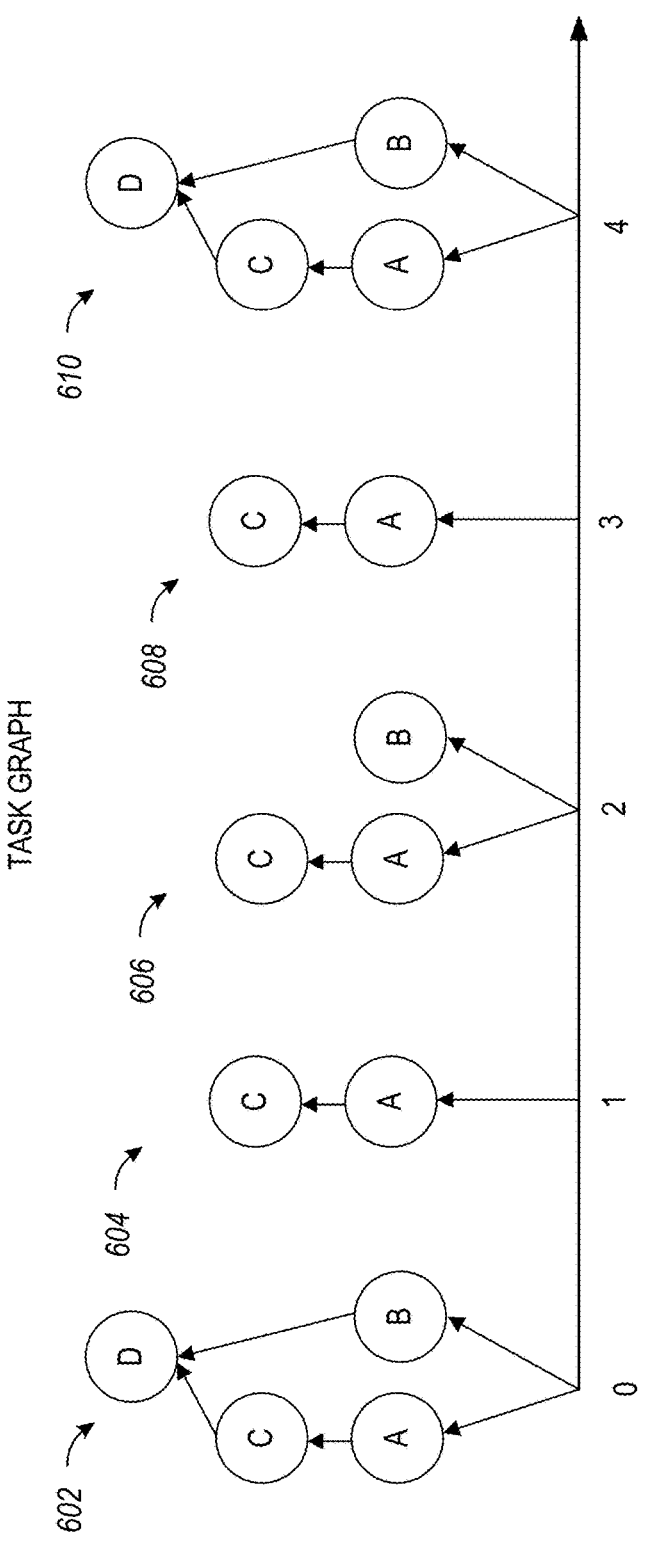
FIG. 6 is a diagram of a task graph of DTs associated with scheduled refreshes at different times according to individual lag targets, in accordance with some embodiments of the present disclosure.

FIG. 6 is a diagram of a task graph 600 of DTs associated with scheduled refreshes at different times according to individual lag targets, in accordance with some embodiments of the present disclosure. Referring to FIG. 6, graph 600 shows scheduled refreshes of DT groups 602, 604, 606, 608, and 610 at corresponding ticks 0, 1, 2, 3, and 4. More specifically, graph 600 shows scheduled refreshes of the DTs of FIG. 5 based on their lag durations. At time instances 0 and 4 (or ticks 0 and 4), all DTs (A, B, C, and D) are refreshed. At ticks 1 and 3, DTs A and C are refreshed, and at tick 2, DTs A-C are refreshed.

As illustrated in FIG. 6, DTs can be refreshed with different refresh cadences based on the corresponding DT lag durations. In some aspects, the refresh cadences can be configured so that when the DTs are refreshed, the DTs produce results that their corresponding queries would have produced at some point in time.

In some aspects, a refresh can be configured to execute a maintenance plan that updates the DT's physical table. In some aspects, at each tick, a rooted prefix of the DAG (e.g., the DT dependency graph) can be refreshed. A consistent snapshot of the DAG can be maintained in memory, and a compute service task can be scheduled for each connected component. The connected component task can enter a scheduling loop, which finds nodes with satisfied dependencies and starts a refresh job. In some aspects, a refresh job has a maintenance plan, which can take one of the following forms: (1) a full refresh (truncate the DT table and insert the result of running the DT definition at the tick time); and (2) incremental refresh (compute the changes in the DT since the last refresh tick and merge them into the DT table).

In some aspects, the refresh job creates table versions at the tick time. New DT table versions can be configured with a new property containing the base tables' version IDs. Retries can skip re-computation if the version has already been computed. Additionally, queries can resolve the correct version by specifying an entity version AT (DT_BASE_TIME=> <ts>).

The following maintenance plan configurations can be used with the disclosed DT-related functions. The disclosed configurations can be used to maintain DTs via full refreshes and incremental updates. The disclosed design configuration can be used to ensure that DT updates preserve the DT history, which can be essential for time-travel queries to produce consistent results and for computing the updates of downstream views.

In some aspects, DTs can be maintained in the following two ways:

(a) Incremental Update. For an update tick, the set of delta changes (delta set) since the last update is computed and merged into the DT. This technique can use the following configurations: (1) all operations of the DT definition are supported for incremental maintenance, and (2) all base relations provide access to their history and can provide their delta sets.

(b) Full Refresh. For each update tick, the view definition is recomputed, and the DT is fully replaced. This technique can be used if the DT definition includes operations that are not yet supported for incremental updates or if it is not possible (or feasible) to retrieve the delta set of a based relation.

In some aspects, incremental updates and full refreshes can be dynamically switched from one to the other (e.g., based on a detected data processing latency characteristic or other configuration settings).

In some embodiments, all rows in a DT can be uniquely identifiable by a ROW_ID metadata attribute. The ROW_ID attribute can be used to match changes from the delta set with the rows in the DT or compute delta sets from a DT that is fully refreshed (e.g., depending on the size of the DT, this can be beneficial because it allows for incremental maintenance of downstream views). Hence, each DT can have a ROW_ID metadata column (which corresponds to the metadata columns of tables with enabled change tracking).

Example requirements for the ROW_ID include incremental and at-once computation of the ROW_ID that may yield the same value, and collisions of ROW_IDs may result in data corruption. In some aspects, unique mechanisms may be used if base relations are referenced multiple times (self-join, self-union-all, . . . ). Generation can be insensitive to plan changes (join order, input order, . . . ). In some aspects, runtime validation ROW_IDs can be expensive for production. Still, a debug mode can be added for tests (e.g., full column comparisons for DELETE and UPDATE changes and uniqueness check for INSERT changes can be performed). In some aspects, streams on views can be used to address the ROW_ID requirements.

In some aspects, the following configurations may be used for incremental update maintenance of DTs. Given a delta set (e.g., a set of changes applied to a DT such as an Insert, a Delete, or an Update) for a DT, it can be applied to the DT in two ways:

(a) Single MERGE command. All changes (e.g., encompassed by the delta set) are applied with a single MERGE DML. Updates are processed as upserts (or merges) on the ROW_ID merge key. The following pseudo-code in Table 2 can be used for performing the MERGE command.

TABLE 2

```
MERGE INTO dt m
USING (
  SELECT *, metadata$action, metadata$isupdate, metadata$row_id
  FROM delta_set
  WHERE
    -- upsert on ROW_ID doesn't require the DELETE of an UPDATE change
    NOT (metadata$action = 'DELETE' AND metadata$isupdate = TRUE)) AS d
ON m.metadata$row_id = d.metadata$row_id
WHEN MATCHED AND metadata$action = 'DELETE'
  THEN DELETE
WHEN MATCHED AND metadata$action = 'INSERT' AND metadata$isupdate
= TRUE
  THEN UPDATE SET m.* = d.*, m.metadata$row_id = d.metadata$row_id
WHEN NOT MATCHED AND metadata$action = 'INSERT' AND
metadata$isupdate = FALSE
  THEN INSERT (*, m.metadata$row_id) VALUES (d.*, d.metadata$row_id);
```

(b) A MERGE command followed by an INSERT command. The DELETE and UPDATE changes of the delta set can be applied with a MERGE DML command. The INSERT changes can be applied later with a separate INSERT DML command. The following pseudo-code in Table 3 can be used for performing the MERGE command followed by the INSERT command.

TABLE 3

```
MERGE INTO dt m
USING (
  SELECT *, metadata$action, metadata$isupdate, metadata$row_id
  FROM delta_set
  WHERE
    -- upsert on ROW_ID doesn't require the DELETE of an UPDATE change
    NOT (metadata$action = 'DELETE' AND metadata$isupdate = TRUE)
    -- INSERT changes are applied with subsequent INSERT DML
    AND NOT (metadata$action = 'INSERT' AND metadata$isupdate = FALSE)
AS d
ON m.metadata$row_id = d.metadata$row_id
WHEN MATCHED AND metadata$action = 'DELETE'
  THEN DELETE
WHEN MATCHED AND metadata$action = 'INSERT' AND metadata$isupdate
= TRUE
  THEN UPDATE SET m.* = d.*, m.metadata$row_id = d.metadata$row_id;
INSERT INTO dt(*)
SELECT d.*
FROM delta_set d
WHERE metadata$action = 'INSERT' AND metadata$isupdate = FALSE;
```

The above processing can reduce the amount of data to match during a MERGE. The delta set may be persisted to consume from both DMLs.

In some aspects, using ROW_ID as a merge key may create a performance issue (e.g., artificial join keys have a bad locality and can result in inferior performance; an additional merge key may need to be added).

In some aspects, the MERGE, as configured by both approaches, may require a perfect delta set without duplicate keys. However, deduplicating changes to obtain a perfect delta set can be costly. Streams can produce perfect delta sets, and no deduplication is needed. Bitsets may reduce the cost to derive delta sets with duplicates significantly such that they outperform perfect delta sets. In some aspects, the MERGE can be configured to deduplicate merge keys. In some aspects, the delta streams can be used to address redundancies (e.g., an insert and delete with the same row ID and the same values for all columns). More specifically, delta streams can filter out redundancies, and bitsets can reduce the number of such redundancies substantially.

In some aspects, the following configurations may be used for full refresh maintenance. A full refresh set can be computed by evaluating the view definition (enriched by the computation of the ROW_ID attribute) on a consistent version of all base relations. The refresh set can be applied in two ways:

(1) Full replacement: deletes all rows of the DT and inserts all rows of the refresh set. Commands listed in Table 4 can be used for a full replacement.

TABLE 4

```
DELETE FROM dt;
INSERT INTO dt(*)
SELECT f.*
FROM full_set f;
```

In some aspects, the ROW_ID ensures that a delta set can be computed from the fully refreshed DT. Depending on the DT size, this processing may be expensive because a full scan and processing of both versions of the DT may be needed.

(2) Merging Changes: compute the differences between both DT versions and evolve the DT into the new version. First, delete all rows that are no longer in the new version, then update all rows that were modified and insert all new rows with a MERGE DML. Commands listed in Table 5 can be used for merging changes.

TABLE 5

```
DELETE FROM dt m
WHERE m.metadata$row__id NOT IN (
SELECT metadata$row__id FROM full__set);
MERGE INTO dt m
USING full__set f
ON m.metadata$row__id = f.metadata$row__id
-- update record
WHEN MATCHED AND m.* <> f.*
  THEN UPDATE SET m.* = d.*, m.metadata$row__id =
  d.metadata$row__id;
-- insert record
WHEN NOT MATCHED
  THEN INSERT (*, m.metadata$row__id) VALUES (d.*,
  d.metadata$row__id);
```

In some aspects, merging changes can be more expensive than fully replacing the DT. However, it may be cheaper to extract a delta set from a DT that was updated by merge because fewer records might have been changed. The initial approach to applying full refresh sets can be a full replacement.

In some aspects, delta sets can be persisted as temporary tables. This allows for merging the delta set in multiple steps (e.g., MERGE for UPDATE/DELETE and INSERT), computing and persisting the delta set before the previous delta has been applied on the DT (e.g., defer merging until DT is on the right version), and scan delta set from the persisted table instead of computing it from DT's history when updating downstream DTs.

After the delta set is merged to its DT and all downstream DTs are updated, the temporary table can be deleted.

Figure 7:
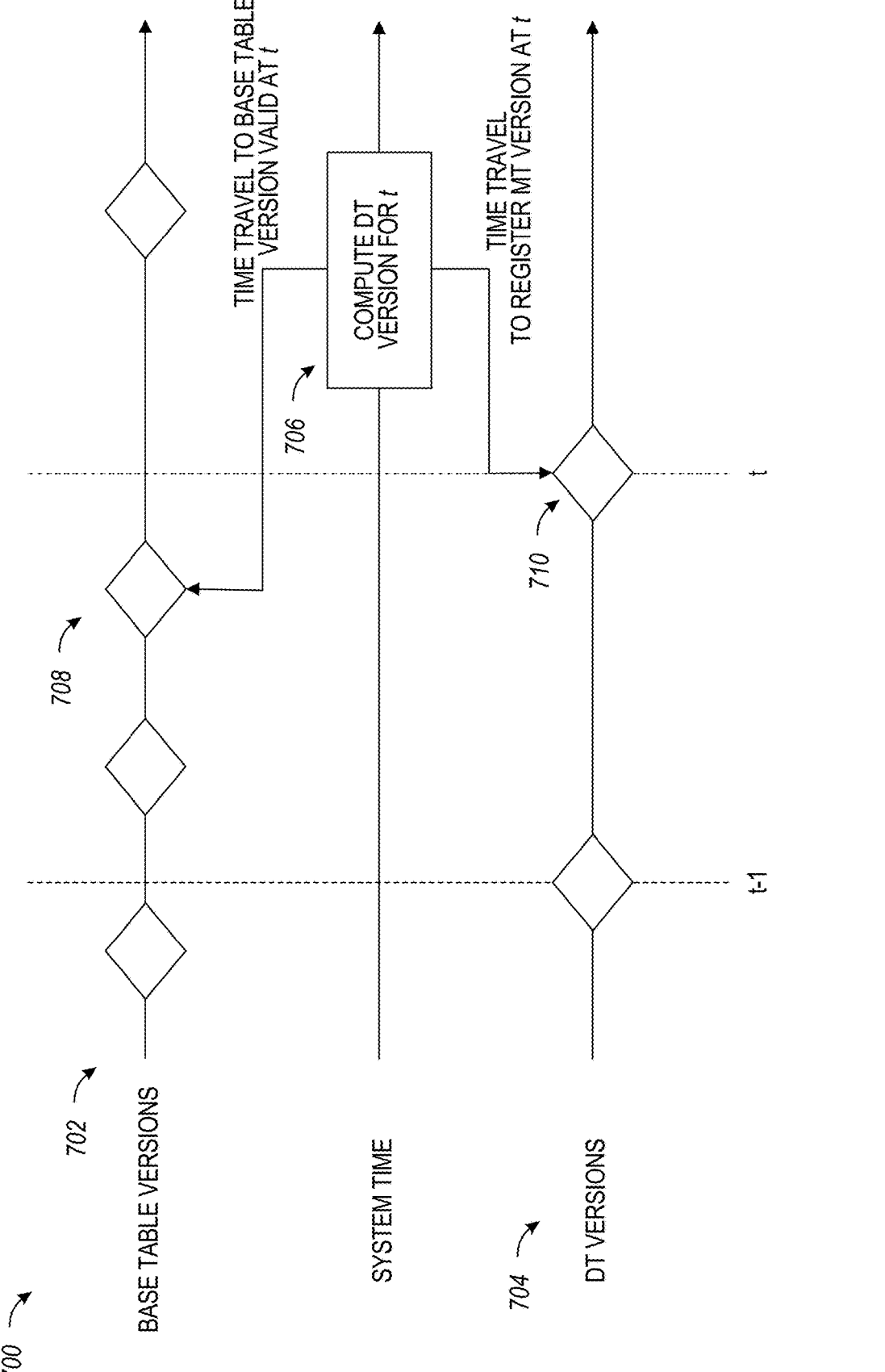
FIG. 7 is a diagram illustrating the use of data manipulation language (DML) commands and time travel queries to compute an updated set of a DT with respect to specific versions of its base relations, in accordance with some embodiments of the present disclosure.

FIG. 7 is diagram 700 illustrating the use of data manipulation language (DML) commands and time travel queries to compute an updated set of a DT with respect to specific versions of its base relations, in accordance with some embodiments of the present disclosure.

In some aspects, the table versions 704 of DTs may be aligned with the base table versions 702 of their corresponding base tables. Using time travel queries (e.g., query 706), the update set of DT 710 may be computed concerning specific versions (e.g., base table 708) of its base relations (e.g., as illustrated in FIG. 7). The new DT version that results from merging the update set in alignment may be registered with the versions of its base relations. Hence, capabilities for the DMLs that update DTs may also be configured. The following describes how to register table versions for DTs and how to look up their versions when they are queried for a specific time.

In some aspects, DML commands that create table versions at a specific time in a DT's base objects' (e.g., base table's) time domain can be configured. The base version time of a new version can be assumed to be after all preceding DT table version base times. Additionally, reads can resolve table versions in this time domain.

In some aspects, streams on DTs can be configured similarly to streams on views (e.g., as discussed in connection with FIGS. 8-12).

Figure 8:
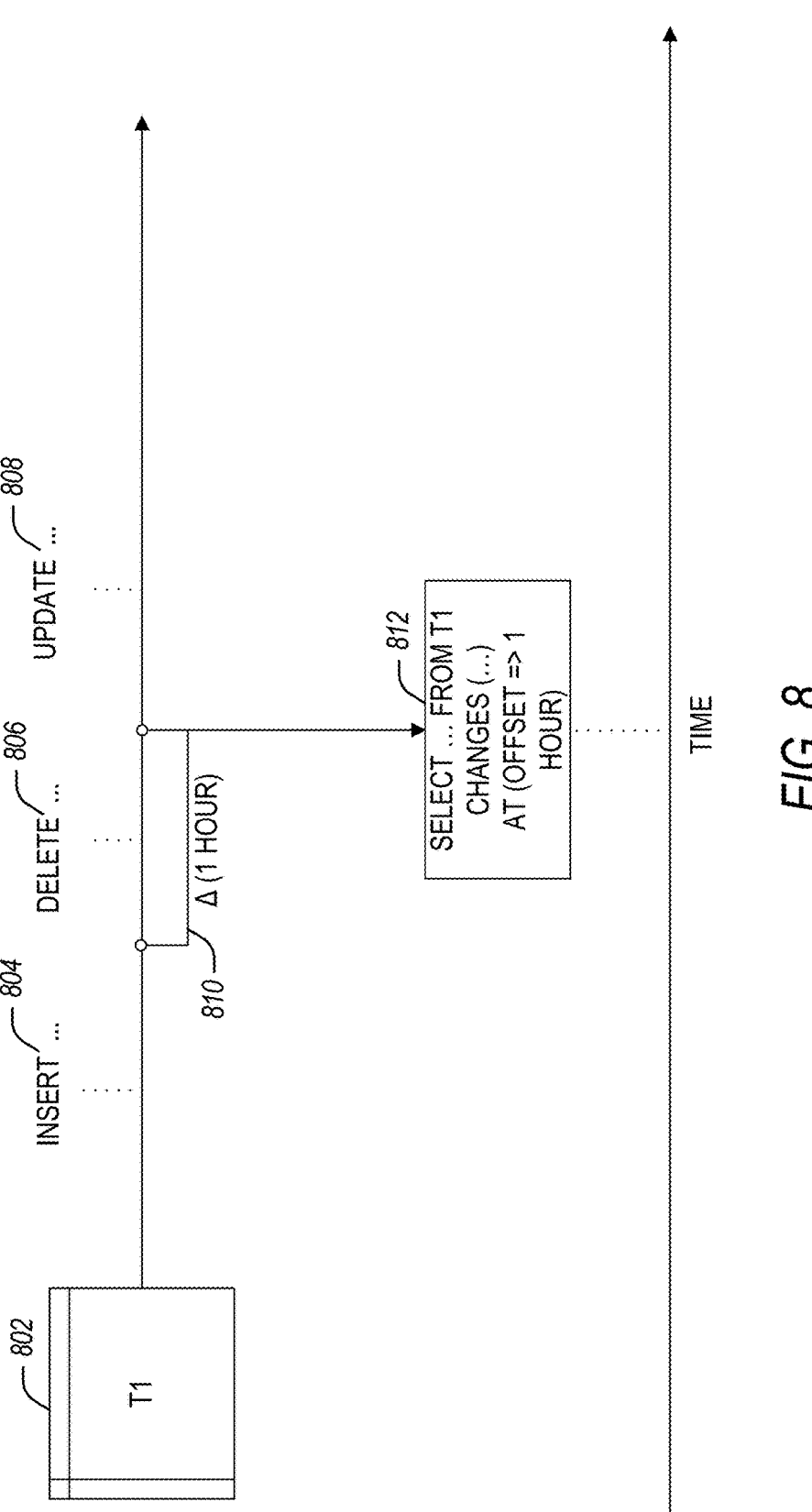
FIG. 8 is a diagram of using a CHANGES clause in connection with query processing, in accordance with some embodiments of the present disclosure.

FIG. 8 is a diagram 800 of using a CHANGES clause in connection with query processing, in accordance with some embodiments of the present disclosure. Referring to FIG. 8, queries or data processing commands Insert 804, Delete 806, and Update 808 are applied to source table 802. As illustrated in FIG. 8, the SELECT statement 812 may be used for returning the changes that occurred to the source table 802 during period 810 (e.g., one hour).

As used herein, the term "stream" refers to a combination of a table and a timestamp. In some aspects, a stream may be used to iterate over changes to a table. When a stream is read inside a Data Manipulation Language (DML) statement, its timestamp may be transactionally advanced to the greater timestamp of its time interval (docs).

Figure 9:
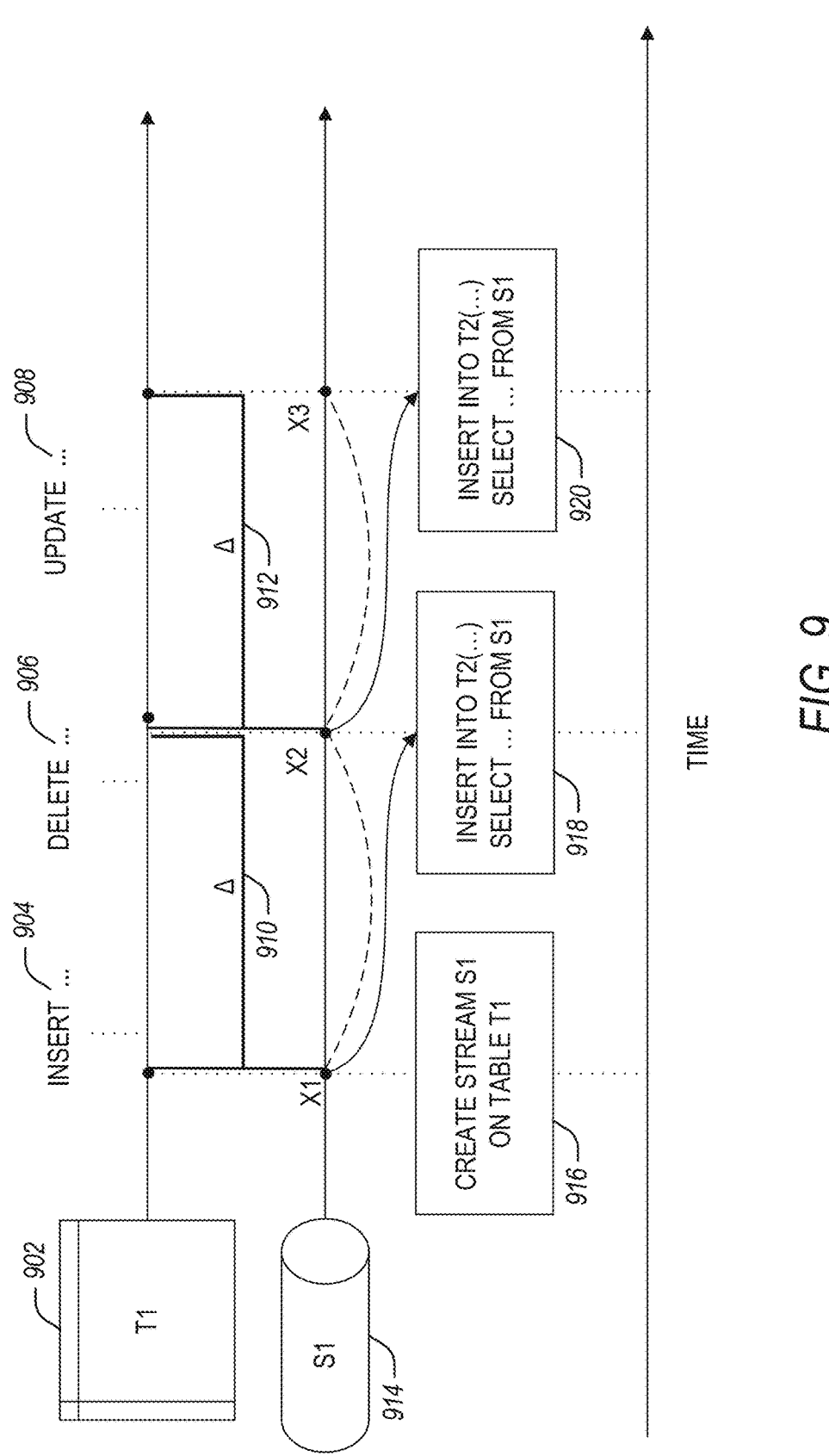
FIG. 9 is a diagram of a stream object configuration for a table, in accordance with some embodiments of the present disclosure.

FIG. 9 is diagram 900 of a stream object configuration for a table, in accordance with some embodiments of the present disclosure. Referring to FIG. 9, queries or data processing commands Insert 904, Delete 906, and Update 908 are applied to source table 902. As illustrated in FIG. 9, a stream 914 is generated on source table T1 902 at times X1, X2 (after a time interval of 910 from X1), and X3 (after a time interval of 912 from X2). Additionally, at operation 916, stream S1 is created on table T1. At operation 918, stream S1 produces the changes in T1 from time X1 to time X2, which are inserted into table T2. At operation 920, stream S1 produces the changes in T1 from time X2 to time X3, which are inserted into table T2.

As used herein, the term "access control" indicates that customers can control who can access database objects within their organization (docs).

As used herein, the term "data sharing" indicates customers can grant access to database objects to other organizations (docs).

In some aspects, any query with a CHANGES clause or a stream may be referred to as a change query. A change query on a view may be defined similarly.

In some embodiments, the DT manager 128 is configured to provide changes to views (e.g., a stream on views) so that the changes may be further processed and acted on. More specifically, the DT manager 128 may be configured to provide or process streams on views in connection with the following three use cases: shared views, complex views, and view evolution. In some aspects, more than one use case may apply at a given time.

Shared (secure) views may be used to provide (e.g., a user or organization) limited access to sensitive data. The consumer of the data often wishes to observe changes to the data being shared with them. Some considerations implied by this use case include giving the consumer visibility into the shared view's retention period and how to enforce secure view limitations on change queries.

Figure 10:
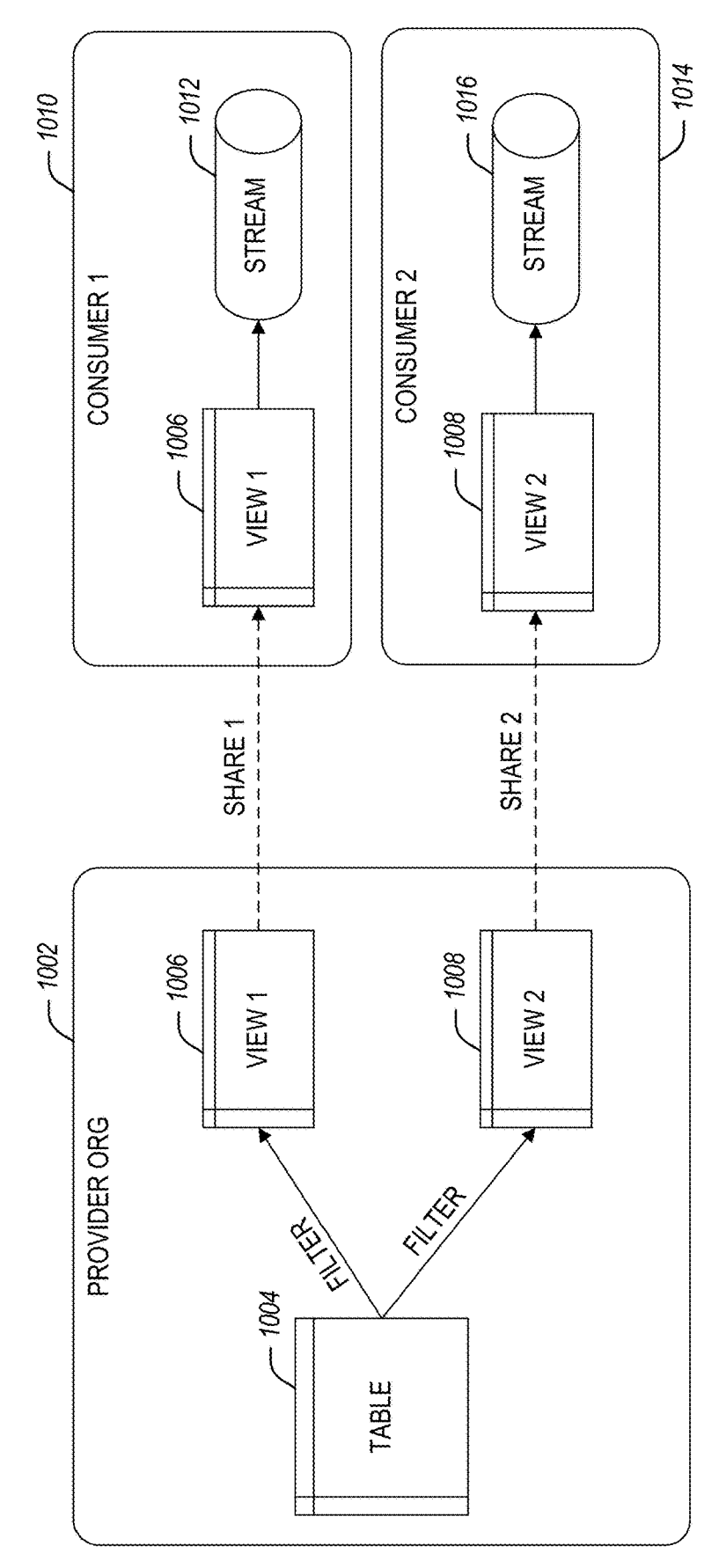
FIG. 10 is a diagram of shared views, in accordance with some embodiments of the present disclosure.

FIG. 10 is a diagram 1000 of shared views, in accordance with some embodiments of the present disclosure. Referring to FIG. 10, a data provider 1002 manages a source table 1004. The data provider 1002 applies different filters to source table 1004 to generate views 1006 and 1008. View 1006 is shared with consumer 1010, and view 1008 is shared with consumer 1014. In some embodiments, the DT manager 128 is used for configuring streams 1012 and 1016 on corresponding views 1006 and 1008 for consumption by consumers 1010 and 1014.

The definition of a view can be quite complex, but observing the changes to such a view may be useful regardless of its complexity. Manually constructing a query to compute those changes may be achieved, but it can be laborious, error-prone, and suffer from performance issues. In some aspects, a change query on a view may automatically rewrite the view query, relieving users of this burden. In some aspects, simple views containing only row-wise operators (e.g., select, project, union all) may be used. In some aspects, complex views that join fact tables with (potentially several) slowly-changing-dimension (DIM) tables may also be used. Other kinds of operators like aggregates, windowing functions, and recursion may also be used in connection with complex views.

Figure 11:
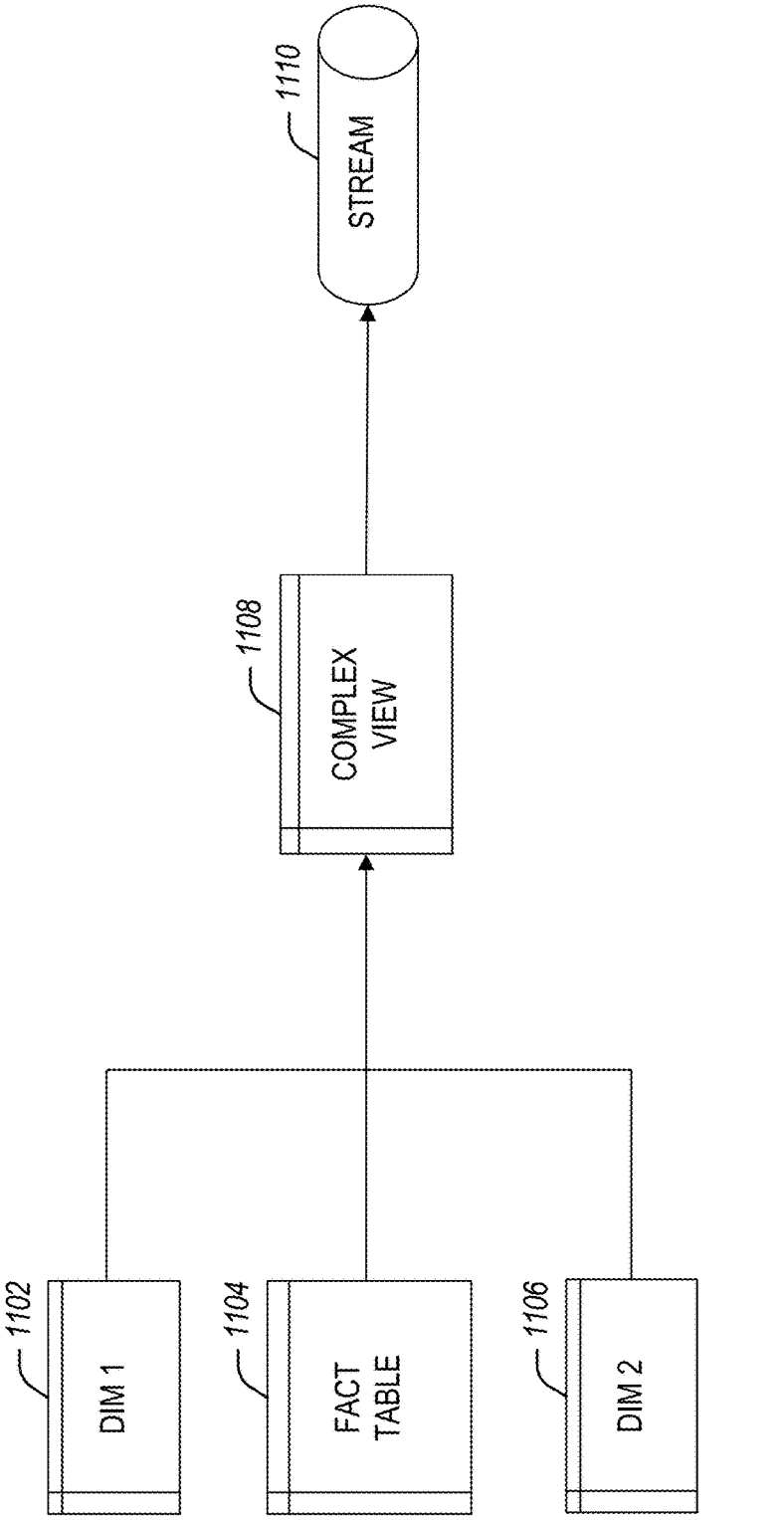
FIG. 11 is a diagram of a stream object based on a complex view, in accordance with some embodiments of the present disclosure.

FIG. 11 is diagram 1100 of a stream object based on a complex view, in accordance with some embodiments of the present disclosure. Referring to FIG. 11, a complex view 1108 may be generated based on source tables 1102, 1104, and 1106. In some embodiments, the DT manager 128 configures a stream 1110 based on the complex view 1108 of source tables 1102, 1104, and 1106.

In some aspects, views may be used to create an abstraction boundary, where the underlying tables can be modified without consumers being aware. For example, a view over a table undergoing a backward-incompatible schema change may be replaced by a new query that presents the same data in a different query, causing a view evolution. In some aspects, change queries may work across view redefinition, allowing change observation to the view uninterrupted by modifications to its definition. Considerations for this use case may include schema compatibility and performance. Some view redefinitions may use full joins to resolve, and others, such as workflows involving table clones, could be resolved more efficiently.

Figure 12:
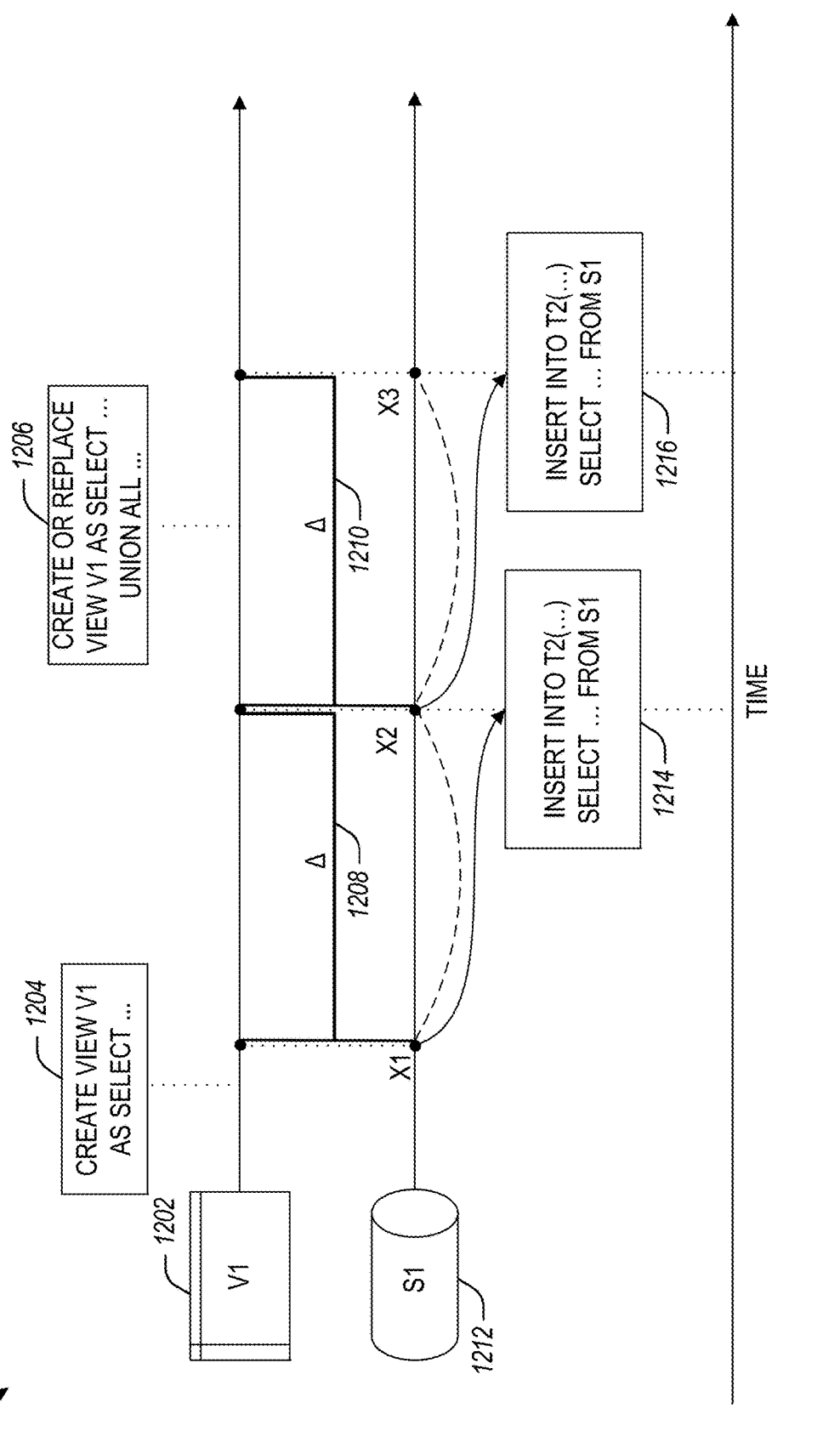
FIG. 12 is a diagram of a view evolution, in accordance with some embodiments of the present disclosure.

FIG. 12 is diagram 1200 of a view evolution, in accordance with some embodiments of the present disclosure. Referring to FIG. 12, at operation 1204, view V1 1202 is created based on a Select operation. Stream S1 1212 of view V1 1202 is generated at times X1, X2 (after a time interval of 1208 from X1), and X3 (after a time interval of 1210 from X2). Additionally, at operation 1214, a stream entry from stream S1 at time X2 is inserted into table T2. Before time X3, view V1 1202 evolves at operation 1206 when a UNION ALL operation is used. At operation 1216, a stream entry from stream S1 (based on the evolved view V1 at time X3) is inserted into table T2.

In some embodiments, to provide or process streams on views in connection with the above-listed use cases, the DT manager 128 may be configured with the following functionalities: intuitive semantics, unsurprising security, linear cost scaling, and easy operability.

In some aspects associated with intuitive semantics, change queries on views may work intuitively and consistently. The essence of a change query is to take a time-varying object and a time interval, then return a set of changes that explain the differences in the object over the interval. This definition applies naturally to views, but some additional configurations are addressed below.

As not all operations may be supported by the DT manager 128, a property on views may be configured, which explicitly allows change queries on it: CHANGE_TRACKING=true. When a view is created with this property enabled, it is validated that the view only contains supported operators and the base tables have change tracking enabled. When a change query is issued on a view, it may succeed if the view has change tracking enabled.

In some aspects, a standing change query (e.g., a stream) may exhibit reference semantics. That is when a user specifies a view in a change query, such specification may be interpreted as referring to the view itself, not what the view is currently defined as. Adopting value semantics would likely result in surprising behavior, especially around access management.

Adopting reference semantics is associated with the ways a view can be modified. The following techniques may be used for view modifications:
(a) "ALTER VIEW . . . RENAME TO . . . " When a view is renamed, objects referencing it may be updated. Complying with this precedent means a stream should break if its view is renamed.

(b) "ALTER VIEW . . . SET SECURE . . . " If a view is made secure, subsequent change queries to it should enforce secure view constraints.
(c) "CREATE OR REPLACE VIEW . . . " If a view is replaced, there are processing choices. Per the View Evolution use case, some users may want the view to keep working as long as the replacement is schema-compatible. However, this may add complexity to the implementation.

In some aspects associated with unsurprising security, a consumer of a change query on a view may have the same access they have to the view itself. The following configurations may apply to all views: creating a stream on a view fails if the underlying tables do not have change tracking enabled and the creator does not have permission to enable it; consumers can see the minimum retention period of the tables referenced by a view (they cannot see which table the retention applies to); and if change tracking was enabled on a table in a view more recently than the beginning of the retention period, consumers can see when it was enabled.

In some aspects, the following configurations may be applied to secure views: consumers cannot see the view's definition; consumers cannot issue a change query before access is granted to the view; optimizations abide by secure view limitations (they do not reorder operators into the expanded view), and the retention period on a table in a secure view is not extended automatically to prevent a consuming stream from going stale.

In some aspects associated with linear cost scaling, a key attribute of change queries on tables is that their cost (both in terms of latency and credits) may be proportional to the result size. Append-only change queries may be introduced to work around cases when this scaling does not hold for delta queries. In some aspects, change queries on views may scale similarly in cost. That is, delta change queries and append-only change queries may scale proportionally to the result size.

In some aspects associated with easy operability, introducing change queries on views may increase the likely distance between the view provider and consumer (the shared views use case may revolve around this). The distance makes collaboration between provider and consumer more difficult. In turn, this means that a smooth operational experience for change queries on views is more important than for traditional change queries. In some aspects, the following operational challenges may be addressed by the DT manager 128: handling view modification and surface errors.

In some aspects associated with the handling of view modifications, if the view provider renames or replaces their view, a stream on it will break. The consumer will then want to take action to repair it. The details of such repairs are use case-specific, but it may involve trying to recreate the stream with a new definition and resuming where the broken stream lets off. To support this, the DT manager 128 may be configured to support statements of the following form: CREATE OR REPLACE STREAM s . . . AT (STREAM=>s). The stream S is being both queried and replaced.

In some aspects associated with surface errors, view consumers may try to issue change queries that are invalid for various reasons. The errors may be surfaced clearly to the consumer. Examples of such errors include: the underlying tables may not have change tracking enabled; the change query may be outside of the tables' retention period; the change query may contain unsupported operators; and the view may have been modified, breaking the change query.

View providers may have control over what happens to a view and any objects derived from it. However, they would benefit from visibility into how the view is being used to avoid accidentally breaking consumers. Examples of such notices include when the provider tries to make a breaking modification to a view, warn the provider that consumers will be disrupted; when consumers' change queries fail due to retention or change tracking, send the provider a notification; and support some introspection as well, such as a view provider looking up the number of streams consuming it and their offsets.

A stream object on tables (including external tables) may be configured to let the user retrieve a stream of changesets as the underlying data in the table changes. A stream object is configured to maintain a position in this list of changesets, and that position is only advanced if it is used in a DML statement. Reading from the stream may return the changeset from the current position up to the current transaction timestamp. As the underlying data changes, the size of the changeset will grow until the stream is advanced. In some aspects, the advance may be transactional.

In some embodiments, the DT manager 128 is configured to create and process stream objects on views, in particular for data-sharing scenarios. In some aspects, shared data consumers may be able to get the latest changes from the shared data provider. Given that exposing shared data is done through secure views, a stream may be created on the consumer side on the view from the provider. In some aspects, streams on materialized views may also be configured to allow retrieving changesets as the underlying MV changes.

In some embodiments, providing changesets on a view (e.g., a query) is similar to the incremental materialized view maintenance problem. In the case of MVs, as the underlying data source(s) change, the materialized data set may be updated incrementally. In some aspects, this processing may be performed at the micro-partition level to create a query plan that uses the data from the added/deleted partitions and merges it with the MV data to produce the updated data.

In the case of a stream object (or stream) on a view, the changeset returned may be the delta of the data the view would return at the current transactional time compared to the data the view would return at the transactional time of the position of the stream. In some aspects, computing the delta efficiently may be a consideration since there may be no materialized data set that can be leveraged and incrementally updated. In some aspects, a materialized view may be created behind the scenes to mitigate this with the limitations of the queries MVs support today, which can make sense, especially for aggregate queries.

In some aspects, the delta for certain classes of queries may be generated efficiently (e.g., if there is only one data source). In that case, the data source of the view can be logically replaced with the delta provided by the stream on the data source. In some embodiments, the DT manager 128 may support projections and filters in the view as well. For example, data processing operators may be allowed where applying the operators on the delta provides the same result as computing the delta on the datasets at the two endpoints. In the initial solution, when the stream is created on a view, support for the view is validated, the data source table is located, and change tracking is set up for the table. When the data is requested from the stream, the underlying view in the query plan is expanded, and the data source table is replaced with generating the delta (similar to the processing applied if a stream on that table is configured in the first place). This processing may also be supported for secure views as well since the data source inside is swapped, and no outside filters would get pushed in.

In addition to maintaining the position of the start point of the change set, the stream may also implicitly expand the retention period on the underlying table up to two weeks depending on how far in the past of the table version history the stream position points. Such processing may also be performed for non-remote data sources. For shared data sources, the same mechanism may not be used because the table compaction status data on the remote side would need to be updated. In this regard, streams on shared data sources can go stale after a day, which is the default retention period for tables. To mitigate this effect, the provider of the shared data can increase the retention period on the table to allow more time for the stream on the provider side to be consumed (and advanced).

Figure 13:
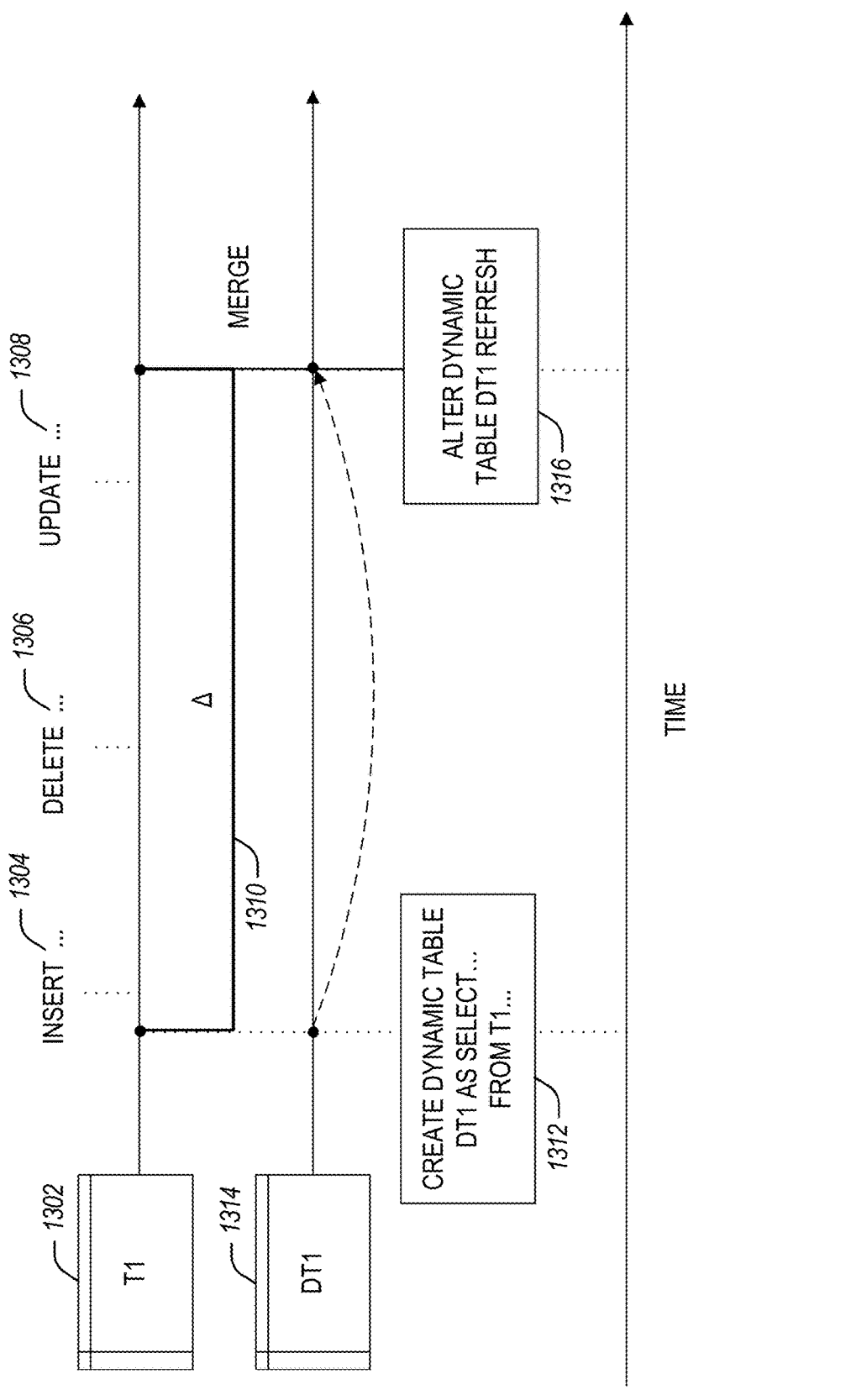
FIG. 13 is a diagram of a dynamic table refresh, in accordance with some embodiments of the present disclosure.

FIG. 13 is diagram 1300 of a dynamic table (DT) refresh, in accordance with some embodiments of the present disclosure. Referring to FIG. 13, at operation 1312, a dynamic table DT1 1314 is created as a select from base table T1 1302. A delta set 1310 can be computed for the base table 1302, which can include data changes based on an Insert operation 1304, a Delete operation 1306, and an Update operation 1308 applied to base table 1302. A refresh operation 1316 can be performed on DT1 1314 by merging the delta set 1310 with DT1 1314.

In some aspects, an incremental refresh of DTs can be configured using the configurations and techniques discussed herein. An incremental refresh can be a more optimal function in place of computing a DT's state every time a refresh is needed. During an incremental refresh, data is considered from the last time query results are computed, the difference between the query results and a new value is determined, and the determined change (or difference) is applied on top of the previous result.

The disclosed incremental refresh configurations can be used to handle several interdependent scenarios, which can make it challenging to partition into independent pieces. The scenarios are:

(a) Nested DTs: One DT queries another DT, and changes to one must be incrementally propagated to the other.

(b) Composite DTs: a single DT contains a sufficiently complex query that needs to be split into two or more DTs containing an intermediate state. A simple example of this scenario is COUNT (DISTINCT *).

(c) Query Facades: When querying a DT, the query plan may need to apply additional operations atop the intermediate state to compute the correct result. An example of this is AVG (_), which can be stored as SUM (_) and COUNT ( ) separately and then produced as the quotient.

Figure 14:
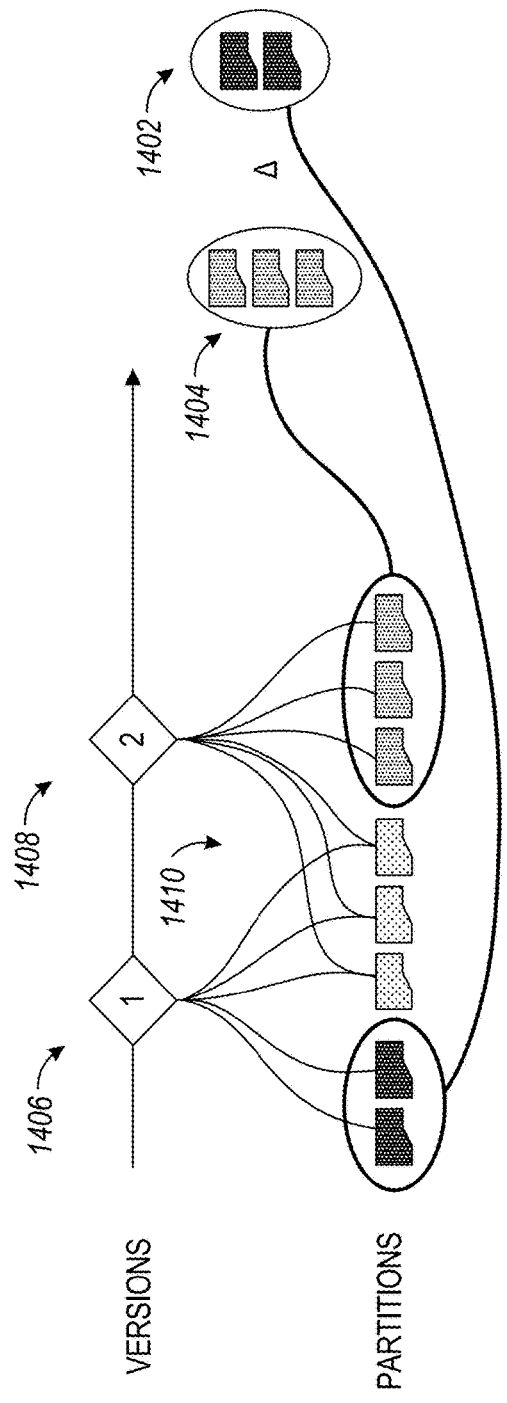
FIG. 14 is a diagram illustrating the determination of changes (or delta ($\Delta$)) to a base table for a DT refresh, in accordance with some embodiments of the present disclosure.

FIG. 14 is a diagram 1400 illustrating the determination of changes (or delta ($\Delta$) or delta set) to a base table for a DT refresh, in accordance with some embodiments of the present disclosure. Referring to FIG. 14, a base table can be associated with versions 1406 and 1408 (also referenced as 1 and 2 in FIG. 14). To determine the delta set, the deleted files 1402 are determined, and the new (added) files 1404 are determined. The common files 1410 can be ignored for purposes of delta set determination. The delta set is the symmetric set difference of the rows in the deleted files 1402 and the rows in the added files 1404.

In some aspects, the DT manager 128 can perform automatic evolution as part of an incremental refresh of a dynamic table. Old data (e.g., data in the DT prior to evolution) can be made available for querying before the DT evolution.

In some aspects, the DT manager 128 can configure automatic evolution functionality and can be used to determine the base objects used by the DT that may influence the content or schema of the result.

Figure 15:
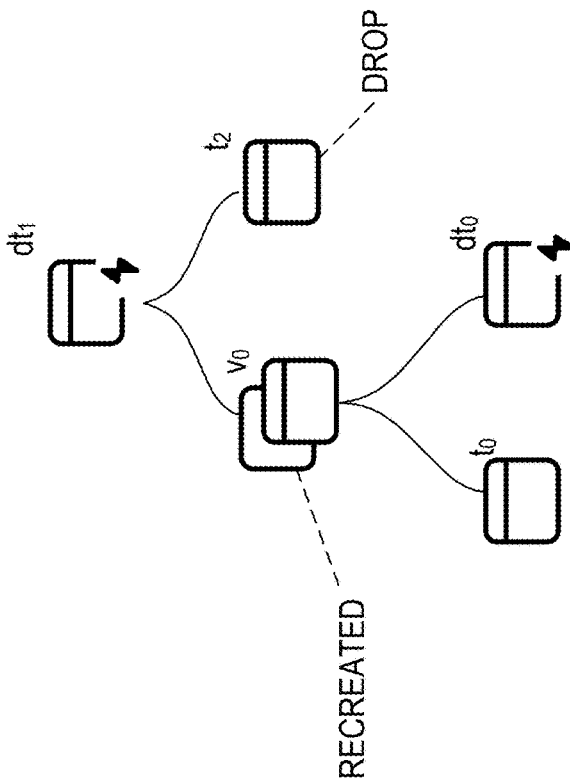
FIG. 15 is a diagram illustrating dynamic table dependency on base objects, in accordance with some embodiments of the present disclosure.

FIG. 15 is a diagram 1500 illustrating dynamic table dependency on base objects, in accordance with some embodiments of the present disclosure. Referring to FIG. 15, dynamic table dt1 depends on base view v0 and base table t2. Additionally, base view v0 depends on base table t0 and another dynamic table dt0.

In some aspects, the DT manager 128 can determine directly and indirectly referenced regular tables (e.g., t2 and t0) and dynamic tables (e.g., dt0) and their columns, directly and indirectly referenced views (e.g., v0), involved user-defined functions as well as any other data that influences data masking.

In some aspects, the DT manager 128 can determine these dependencies and persist them during a refresh and then compare the current dependencies with the dependencies of the next refresh to determine a delta. For more significant changes, such as replaced base tables/views/functions, the DT manager 128 performs a full reinitialization. Otherwise, the DT manager 128 can perform automatic evolution of the dynamic table by updating the dynamic table based on the determined delta, in lieu of performing a reinitialization of the table. Additional examples associated with the automatic evolution of dynamic tables are discussed in connection with FIG. 16-FIG. 26.

In some aspects, the DT manager 128 can detect a schema change in at least one base object and perform partial repairs that only recalculate smaller portions of the data, which avoids full reinitialization of the DT.

For example, a DT definition may be implicitly changed when based on changed views or when using SELECT * and the column of a base table changes. The following configurations can be used when the DT manager detects implicit schema changes. Such changes may happen if the user recreates a column or table or if the user widens the column type. By comparing the physical schema of the DT with the inferred schema of the view, the DT manager can detect the base object changes.

In some aspects, the DT manager can adjust the query plan of the refresh to update the schema of the DT. The query plan of a refresh can include a merge (incremental refresh) or an insert (overwrite for full refresh/reinitialization). In some aspects, the DT manager can use subplans that perform DDL statements, which can be done for a fault-tolerant update model.

For schematic changes, the DT manager 128 can add additional subplans that adjust the physical DT. In some aspects, a full reinitialization can be triggered for most schema changes (except when dropping columns) as the data has probably changed. In some aspects, the DT manager 128 can configure additional subplans to partially reinitialize a column and do an incremental refresh afterward.

In some aspects, the DT manager 128 can be configured to support changes in base views. Schematic changes can trigger an error message, and most other changes are undetected. Changes in base views are subtle as they may come from transitive changes in their base views or their base tables.

In some aspects, the DT manager 128 can resolve transitive base tables of a view and track their columns as if they are regular base tables. The DT manager 128 can also store the definition timestamps of the views to detect explicit view changes. Any definition change of a view can result in full refreshes of the using DT, even if the change may be unrelated to the DT.

In some aspects, the DT manager 128 can track the definition of views, their base views, and all base tables. It can recursively check for any change and adjust as with base tables by tracing the column lineage. In some aspects, the DT manager 128 can use a DDL log approach and perform time travel on the view definition and only track definition timestamps (or else the table data object may become too big if the full definitions of all transitive base views are stored).

In some aspects, the DT manager 128 can support explicitly altering the DT definition. For example, the DT manager 128 can be configured to support implicit schema changes and explicit changes to the DT. In some aspects, the DT manager 128 can be configured to use the following two DDLs listed in Table 6 below.

TABLE 6

| |
|---|
| ALTER DYNAMIC TABLE dt SET DEFINITION='SELECT * FROM base' |
| CREATE OR ALTER DYNAMIC TABLE dt LAG='1 minute' ... |

In both cases, the DT manager 128 can adjust the schema of the underlying table and trigger a reinitialization. In some aspects, an EXPLAIN plan can be added for both commands to highlight that a full reinitialization is necessary. In some aspects, more commands for common use cases can be added, such as the example commands listed in Table 7 below.

TABLE 7

| |
|---|
| ALTER DYNAMIC TABLE dt ADD COLUMN col VARCHAR AS (base.col * 2) |
| ALTER DYNAMIC TABLE dt REMOVE COLUMN col |
| ALTER DYNAMIC TABLE dt RENAME COLUMN col TO col2 |

Figure 16:
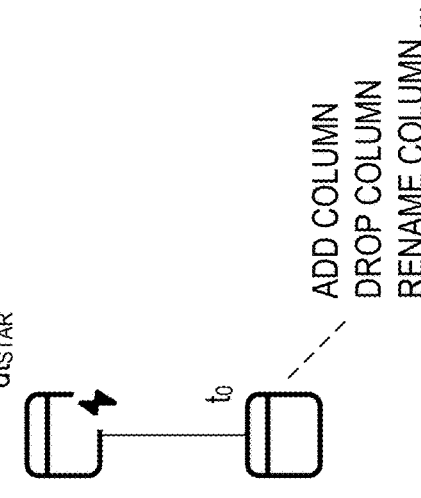
FIG. 16 is a diagram illustrating changes in a base object of a dynamic table, in accordance with some embodiments of the present disclosure.

FIG. 16 is a diagram 1600 illustrating changes in a base object of a dynamic table, in accordance with some embodiments of the present disclosure. Referring to FIG. 16, the DT star is created using base table t0. Any column addition, column deletion, or column rename in the base table can be addressed by determining a delta between a current base object dependency (e.g., the current state of base table t0) and a prior base object dependency (e.g., a persisted state of base table t0 generated at a prior time).

Figure 17:
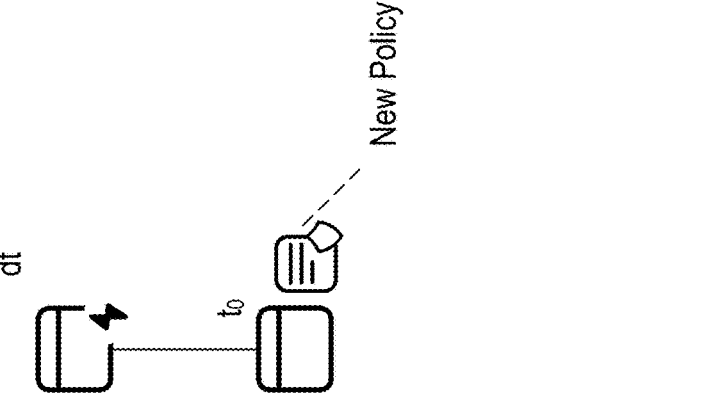
FIG. 17 is a diagram illustrating changes in a data access policy for a base object of a dynamic table, in accordance with some embodiments of the present disclosure.

FIG. 17 is a diagram 1700 illustrating changes in a data access policy for a base object of a dynamic table, in accordance with some embodiments of the present disclosure. Referring to FIG. 17, dynamic table dt can depend on base table t0. In some aspects, the DT manager 128 can configure the automatic evolution of dynamic table dt using the disclosed techniques when a new data access policy is configured for base table t0. For example, if a new data access policy is configured for base table t0 (or an existing policy is altered or replaced), a full reinitialization of the DT can be performed.

In some aspects, a full reinitialization is also performed when a base object is dropped or replaced.

Figure 18:
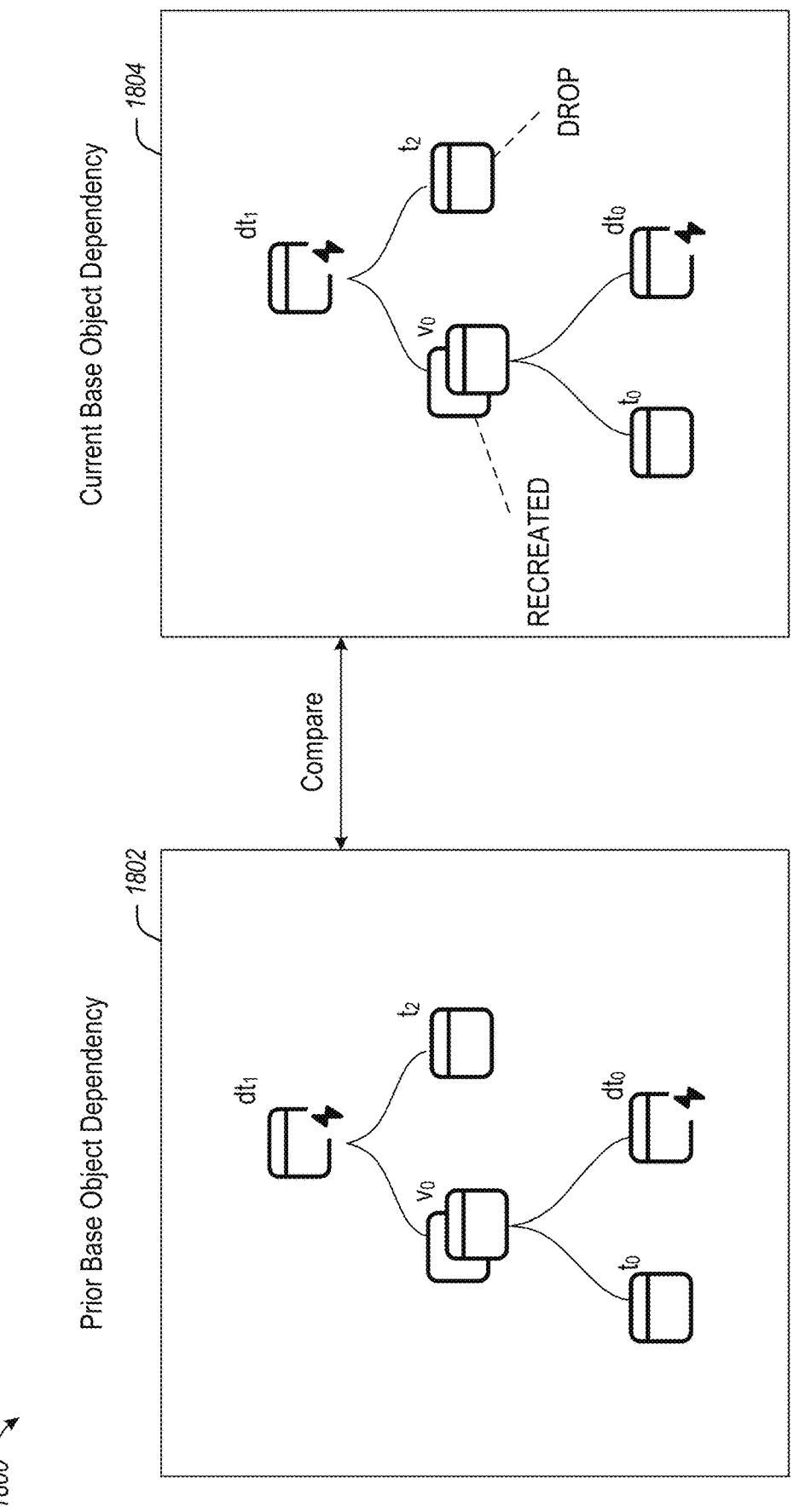
FIG. 18 is a diagram of a previous and current base object dependency that can be used for DT evolution, in accordance with some embodiments of the present disclosure.

FIG. 18 is a diagram 1800 of a previous and current base object dependency that can be used for DT evolution, in accordance with some embodiments of the present disclosure. Referring to FIG. 18, the DT manager 128 can determine a prior base object dependency 1802 for a dynamic table dt1. For example, dt1 can depend on base view v0 and base table t2. Base view v0 can depend on base table t0 and dynamic table dt0. The DT manager 128 can persist the prior base object dependency 1802 (e.g., in external or local storage).

In some aspects, the DT manager 128 also determines a current base object dependency 1804 for the same dynamic table dt1. For example, the current base object dependency 1804 can be based on base view v0 being recreated and base table t2 being dropped.

In some aspects, the DT manager 128 can compare the prior base object dependency 1802 and the current base object dependency 1804 to generate a delta (or an indication of the difference) and determine whether to automatically evolve the dynamic table (e.g., by applying changes directly to the dynamic table) or perform a full dynamic table reinitialization.

Figure 19:
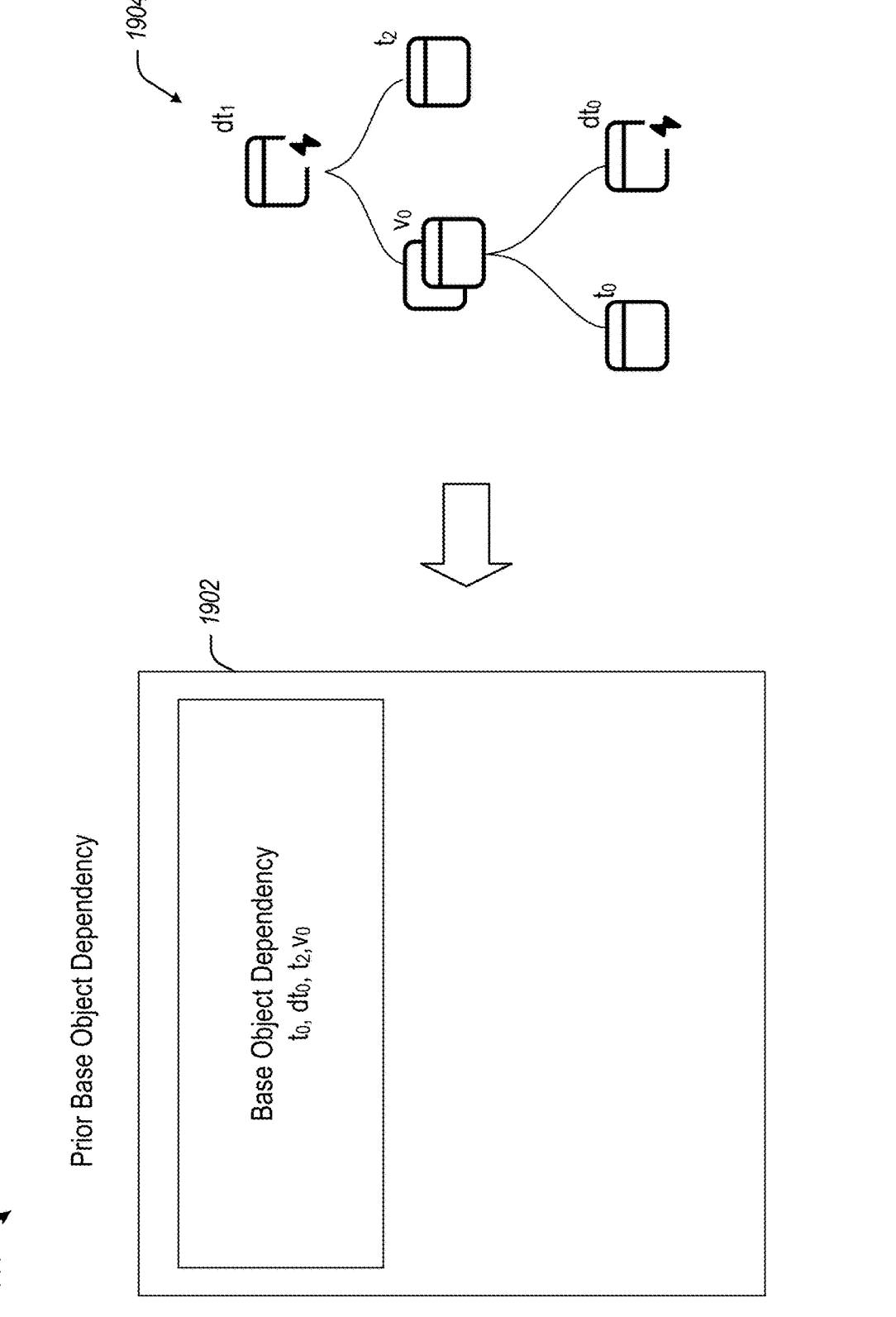
FIG. 19 is a diagram illustrating a dependency graph of a previous base object dependency for a DT, in accordance with some embodiments of the present disclosure.

FIG. 19 is a diagram 1900 illustrating a dependency graph of a prior base object dependency for a DT, in accordance with some embodiments of the present disclosure. Referring to FIG. 16, the DT manager 128 can generate a dependency graph 1904 to determine the prior base object dependency 1902 as well as a current base object dependency. Since dt1 can depend on base view v0 and base table t2, and base view v0 can depend on base table t0 and dynamic table dt0, the prior base object dependency 1902 can be indicated as "t0, dt0, t2, v0."

Figure 20:
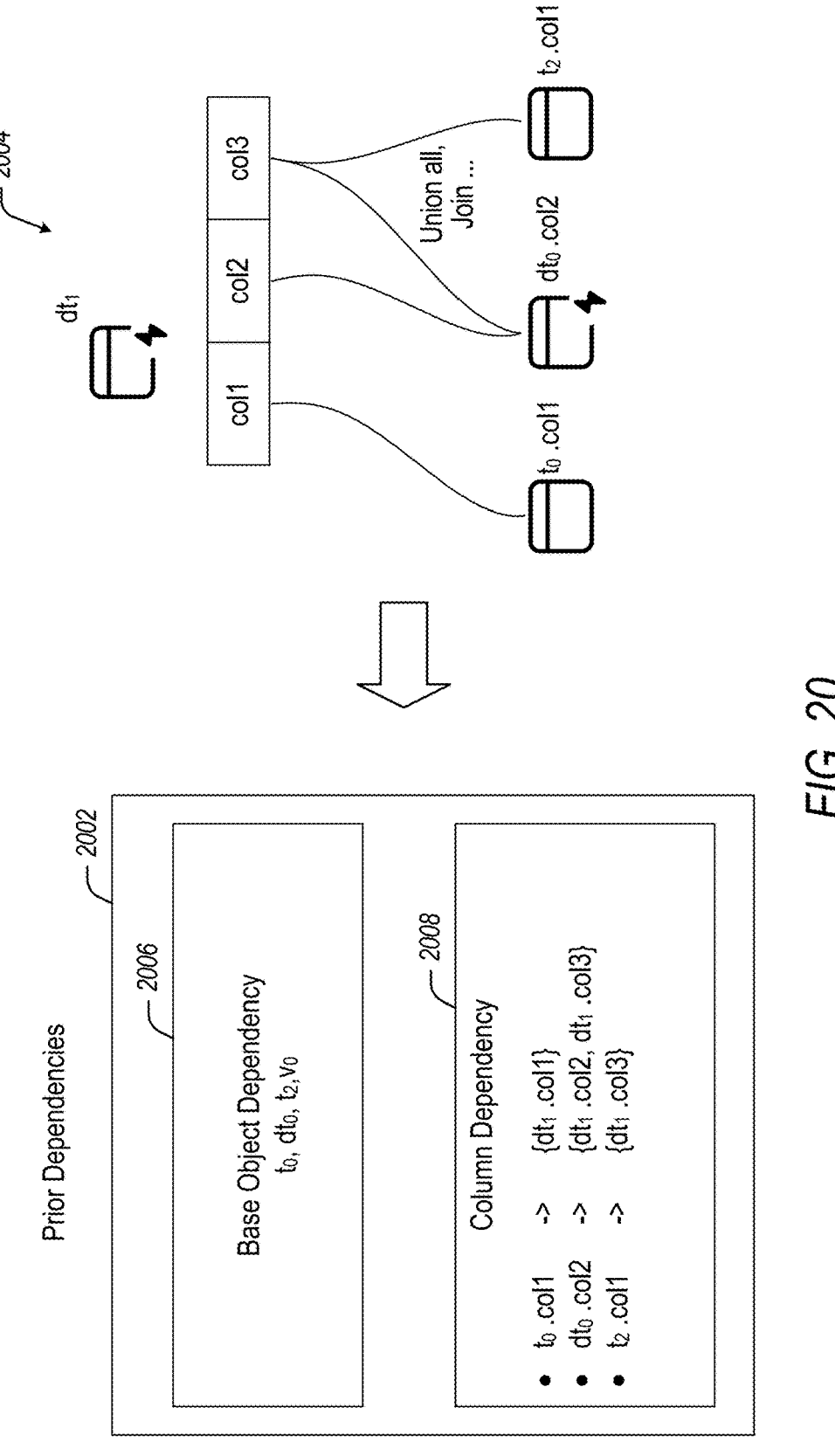
FIG. 20 is a diagram illustrating a previous dependency, including base object dependency and a column dependency for a DT, in accordance with some embodiments of the present disclosure.

FIG. 20 is a diagram 2000 illustrating prior dependencies, including base object dependency and a column dependency for a DT, in accordance with some embodiments of the present disclosure. Referring to FIG. 20, the DT manager 128 can determine prior dependencies 2002 in connection with performing automatic evolution of dynamic tables.

For example, the DT manager 128 can determine a base object dependency 2006 and a column dependency 2008. The base object dependency determination has been described above in reference to FIGS. 18-19.

In some aspects, the DT manager 128 can generate a column dependency graph 2004 indicating dependencies of one or more columns of a dynamic table. For example, column dependency graph 2004 indicates column dependencies for columns col1, col2, and col3. More specifically, col1 depends on col1 from base table t0, col2 depends on col2 from base dynamic table dt0, and col3 depends on col2 from base dynamic table dt0 and col1 from base table t2 (UNION ALL, JOIN, or another operator applied to data from the base object columns). The determined column dependency can be stored as column dependency 2008 as part of the prior dependencies 2002.

The prior dependencies can be performed prior to a current time instance, can be persisted in storage, and can be retrieved by the DT manager 128 at a current time instance when a determination is made on whether automatic evolution of the dynamic table dt1 can be performed.

As illustrated in FIG. 20, prior dependencies 2002 can include base object dependency 2006 and column dependency 2008. The DT manager 128 can use one or both of the base object dependency 2006 and the column dependency 2008 to determine whether automatic evolution of the dynamic table dt1 can be performed. In aspects when column dependency 2008 is used, it can be compared with a current column dependency to determine a delta. This delta can be in addition to a delta determined based on a comparison of the prior base object dependency and the current base object dependency. One or both of these deltas can be used to determine whether automatic evolution of the dynamic table dt1 can be performed.

Figure 21:
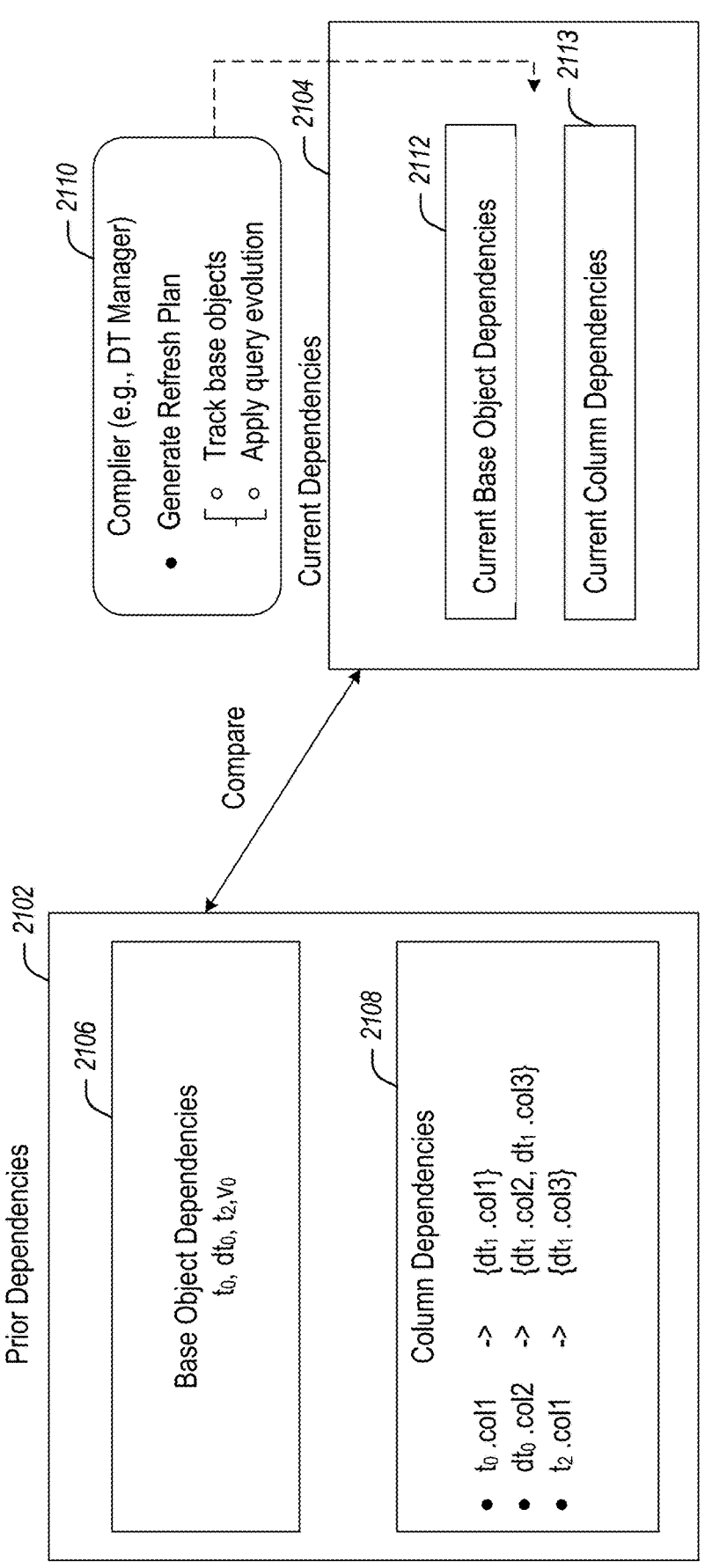
FIG. 21 is a diagram illustrating automatic evolution of a DT using previous and current dependencies, in accordance with some embodiments of the present disclosure.

FIG. 21 is a diagram 2100 illustrating automatic evolution of a DT using previous and current dependencies, in accordance with some embodiments of the present disclosure. Referring to FIG. 21, a compiler 2110 (which can be part of the DT manager 128) can determine prior dependencies 2102 associated with a dynamic table dt1.

In some aspects, the DT manager 128 (or compiler 2110) can determine prior dependencies 2102 at a time instance before a current time instance. As described above, the prior dependencies can include base object dependencies 2106 and column dependencies 2108. In some aspects, compiler 2110 can also determine current dependencies 2104, which can include current base object dependencies 2112 and current column dependencies 2113.

In some aspects, the DT manager 128 (or compiler 2110) can parse a query associated with a dynamic table (e.g., dt1) to determine a current base object dependency of the dynamic table on at least a first base object (e.g., current dependencies 2104).

In some aspects, the DT manager 128 (or compiler 2110) retrieves a prior base object dependency of the dynamic table (e.g., a dependency on the at least first base object or at least a second base object). For example, compiler 2110 can retrieve the prior dependencies 2102 (e.g., can retrieve one or both of base object dependencies 2106 and column dependencies 2108).

In some aspects, the DT manager 128 (or compiler 2110) determines a delta between base objects of the last refresh and the current base objects. In some aspects, the delta is determined between different versions of the same base object. In some aspects, the delta is determined between data stored by the at least first base object and data stored by the at least second base object (e.g., one or both of a first delta between base object dependencies 2106 and 2112 and a second delta between column dependencies 2108 and 2113).

For example, consider a DT "SELECT * FROM base". In the first refresh, the base table may contain only one column. In the second refresh, the same base table may have another column. In this regard, the same base object and the same query text is used to determine the delta.

In some aspects, the DT manager 128 (or compiler 2110) updates the dynamic table based on the delta. For example, compiler 2110 uses one or both of the first delta and the second delta to apply query evolution to the DT (e.g., apply any column additions or column deletions to the DT dt1 based on one or both of the deltas). In some aspects, compiler 2110 can determine to perform a full DT reinitialization based on one or both of the determined deltas (e.g., when an entire base object is dropped, a new base object is added, and a data access policy is added or changed).

In some aspects, the DT manager 128 (or compiler 2110) creates the dynamic table dt1 using a table definition. The table definition includes the query and a lag duration value. The lag duration value indicates the maximum time period that the result of a prior refresh of the query lags behind a current time instance.

In some aspects, the DT manager 128 (or compiler 2110) detects at least a second query associated with the dynamic table. Prior to the updating, the DT manager 128 (or compiler 2110) causes the execution of the at least second query based on data of the dynamic table.

In some aspects, the DT manager 128 (or compiler 2110) detects that the at least first base object includes a first version of one or more directly referenced base objects or one or more indirectly referenced base objects.

In some aspects, the DT manager 128 (or compiler 2110) detects that the at least second base object includes a second version of the one or more directly referenced base objects or the one or more indirectly referenced base objects (where the second version is generated after the first version).

In some aspects, the DT manager 128 (or compiler 2110) determines the second version is generated based on adding, dropping, or renaming a table column of the one or more directly referenced base objects or the one or more indirectly referenced base objects. In some aspects, the DT manager 128 (or compiler 2110) performs the updating based on adding, dropping, or renaming the table column in the dynamic table.

In some aspects, the DT manager 128 (or compiler 2110) determines the second version is generated based on dropping a base table from the one or more directly referenced base objects or the one or more indirectly referenced base objects. In some aspects, the DT manager 128 (or compiler 2110) suspends a refresh of the dynamic table based on the dropping of the base table.

In some aspects, the DT manager 128 (or compiler 2110) determines the second version is generated based on an application of an access policy to at least one of the one or more directly referenced base objects or the one or more indirectly referenced base objects. In some aspects, the DT manager 128 (or compiler 2110) performs a full refresh of the dynamic table based on the application of the access policy.

In some aspects, the DT manager 128 (or compiler 2110) determines a current column dependency of at least one column of the dynamic table on one or more columns of the at least first base object. In some aspects, the DT manager 128 (or compiler 2110) retrieves a prior column dependency of the at least one column of the dynamic table on the one or more columns of the at least first base object. In some aspects, the DT manager 128 (or compiler 2110) determines an additional delta between data stored by the one or more columns of the at least first base object between a time the current column dependency is determined and time the prior column dependency is determined. In some aspects, the DT manager 128 (or compiler 2110) updates the one or more columns of the dynamic table based on the additional delta.

Some example use case scenarios related to the automatic evolution of dynamic tables are discussed in connection with FIGS. 22-25.

Figure 22:
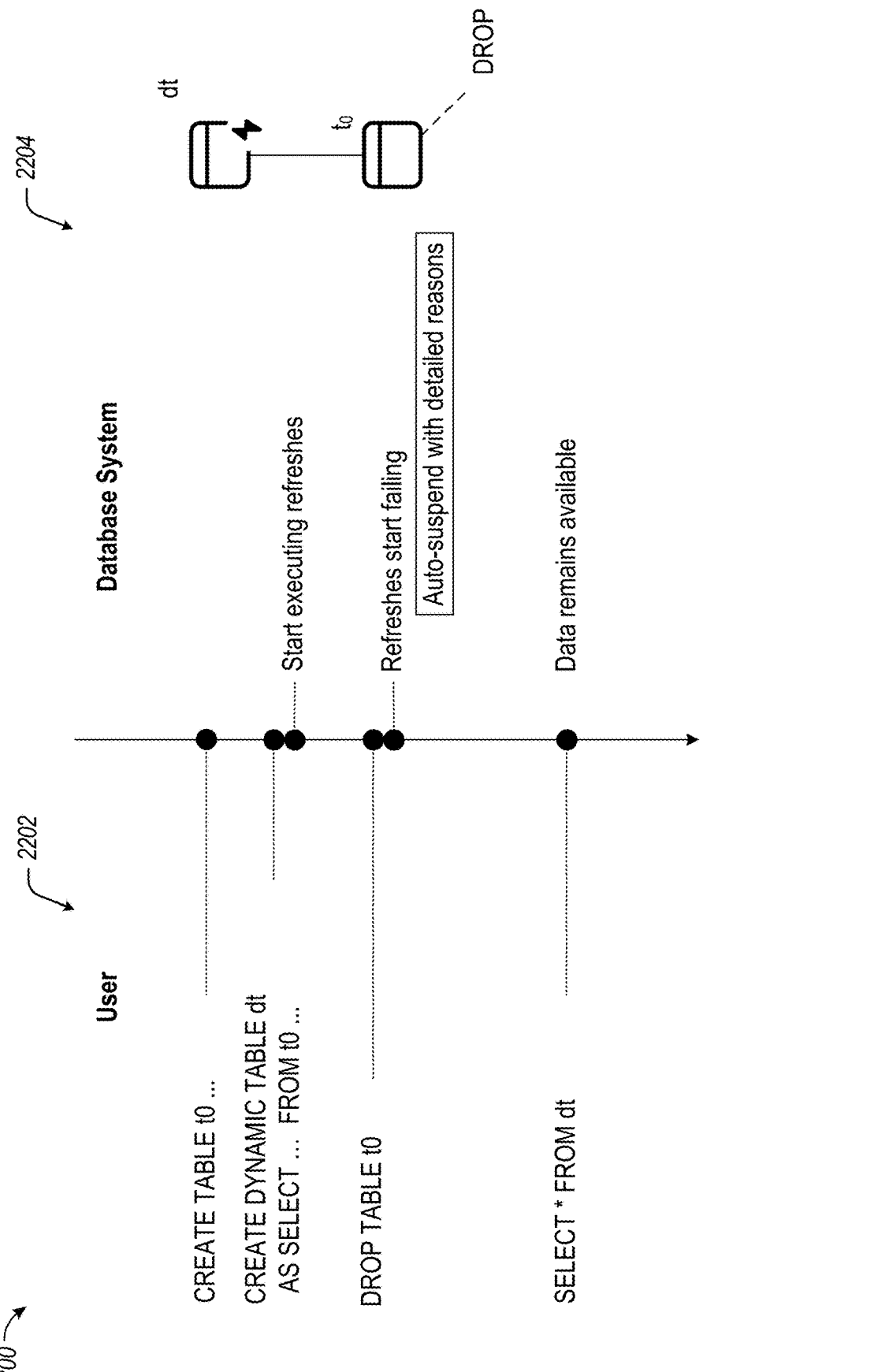
FIG. 22 is a diagram illustrating DT refresh configuration when a base object is dropped, in accordance with some embodiments of the present disclosure.

FIG. 22 is a diagram 2200 illustrating DT refresh configuration when a base object is dropped, in accordance with some embodiments of the present disclosure. Referring to FIG. 22, functionalities 2202 can be performed/configured by a user of the network-based database system 102 and can include dropping a base table t0 (on which dynamic table dt depends). Functionalities 2204 can be performed by the DT manager 128. Based on a base table to being dropped, the DT manager 128 can automatically suspend DT evolution and can provide a reason (e.g., an indication of the dropped base table t0).

Figure 23:
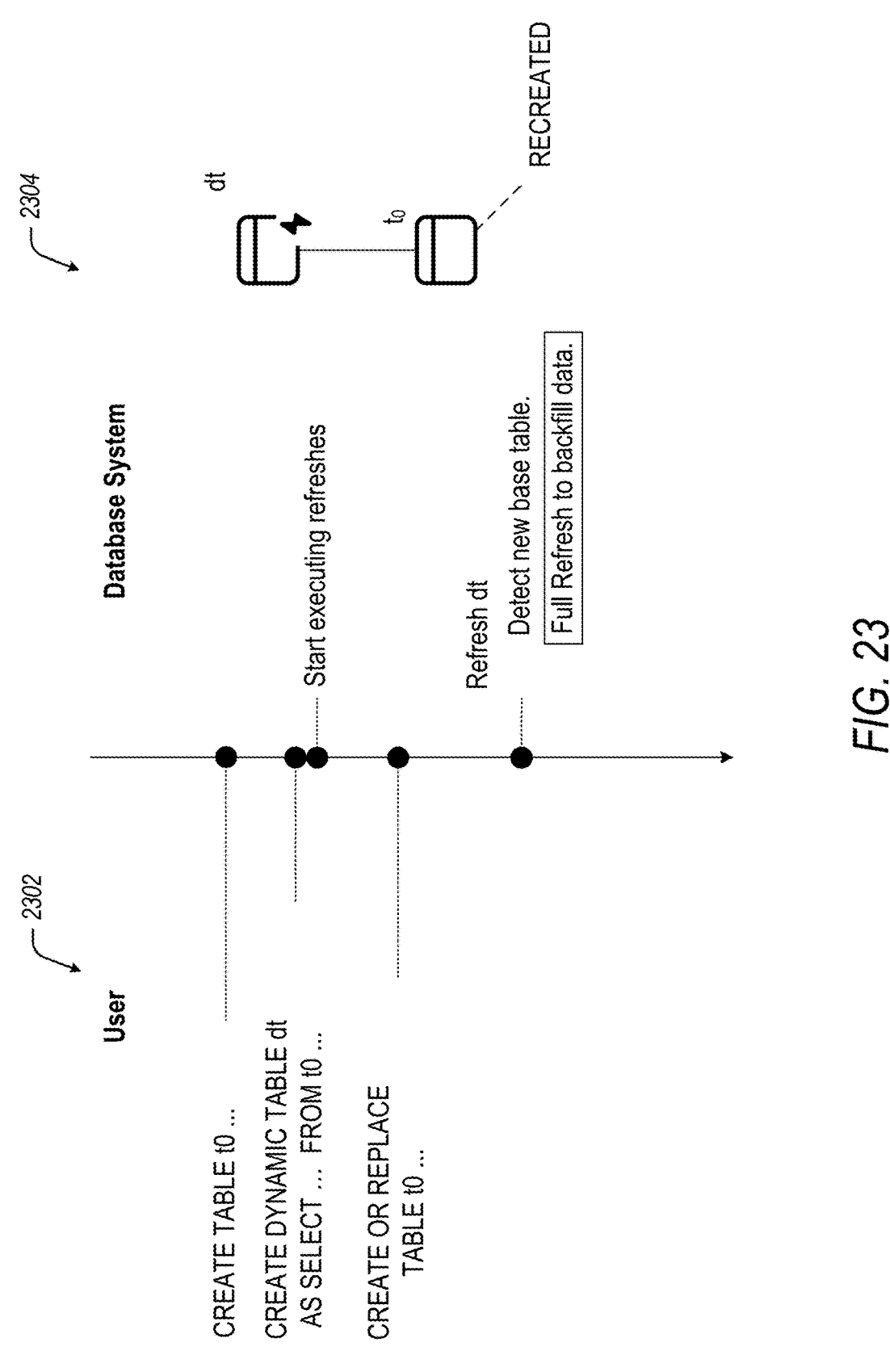
FIG. 23 is a diagram illustrating DT refresh configuration when a base object is recreated, in accordance with some embodiments of the present disclosure.

FIG. 23 is a diagram 2300 illustrating DT refresh configuration when a base object is recreated, in accordance with some embodiments of the present disclosure. Referring to FIG. 23, functionalities 2302 can be performed/configured by a user of the network-based database system 102 and can include recreating (e.g., replacing) a base table t0 (on which dynamic table dt depends). Functionalities 2304 can be performed by the DT manager 128. Based on a base table to being recreated, the DT manager 128 can configure a full refresh of the dynamic table dt to backfill data from the replaced base table.

Figure 24:
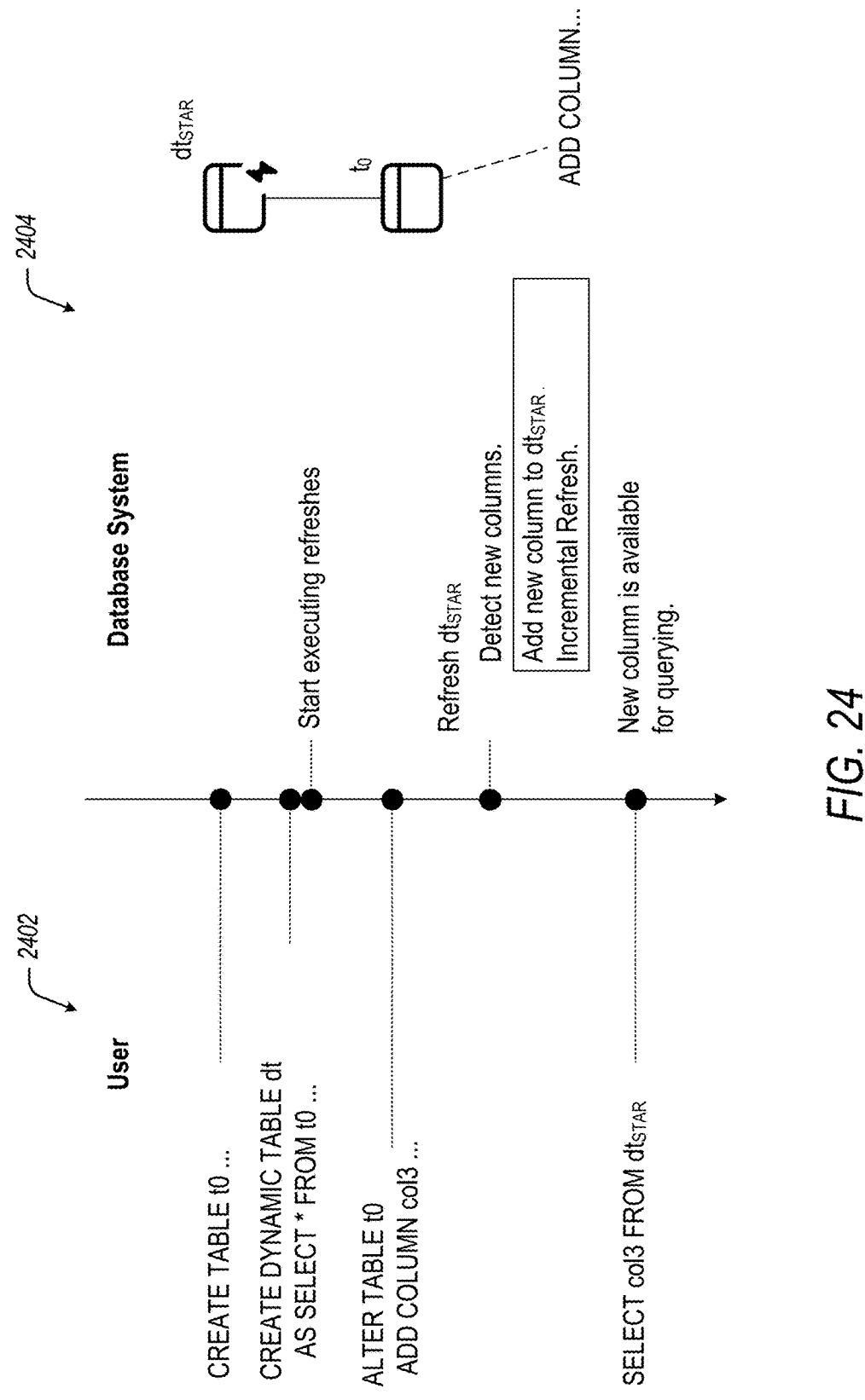
FIG. 24 is a diagram illustrating DT refresh configuration when a new column is added to a base object, in accordance with some embodiments of the present disclosure.

FIG. 24 is a diagram 2400 illustrating DT refresh configuration when a new column is added to a base object, in accordance with some embodiments of the present disclosure. Referring to FIG. 24, functionalities 2402 can be performed/configured by a user of the network-based database system 102 and can include altering a base table t0 (on which dynamic table dt depends) to add a new column. Functionalities 2404 can be performed by the DT manager 128. Based on a base table t0 being revised by adding a new column, the DT manager 128 can configure an incremental refresh and update the dynamic table dt accordingly (e.g., determine a delta between a prior dependency and a current dependency of the DT to obtain the data that was newly added (the data of the added column) and then update the DT based on the delta).

Figure 25:
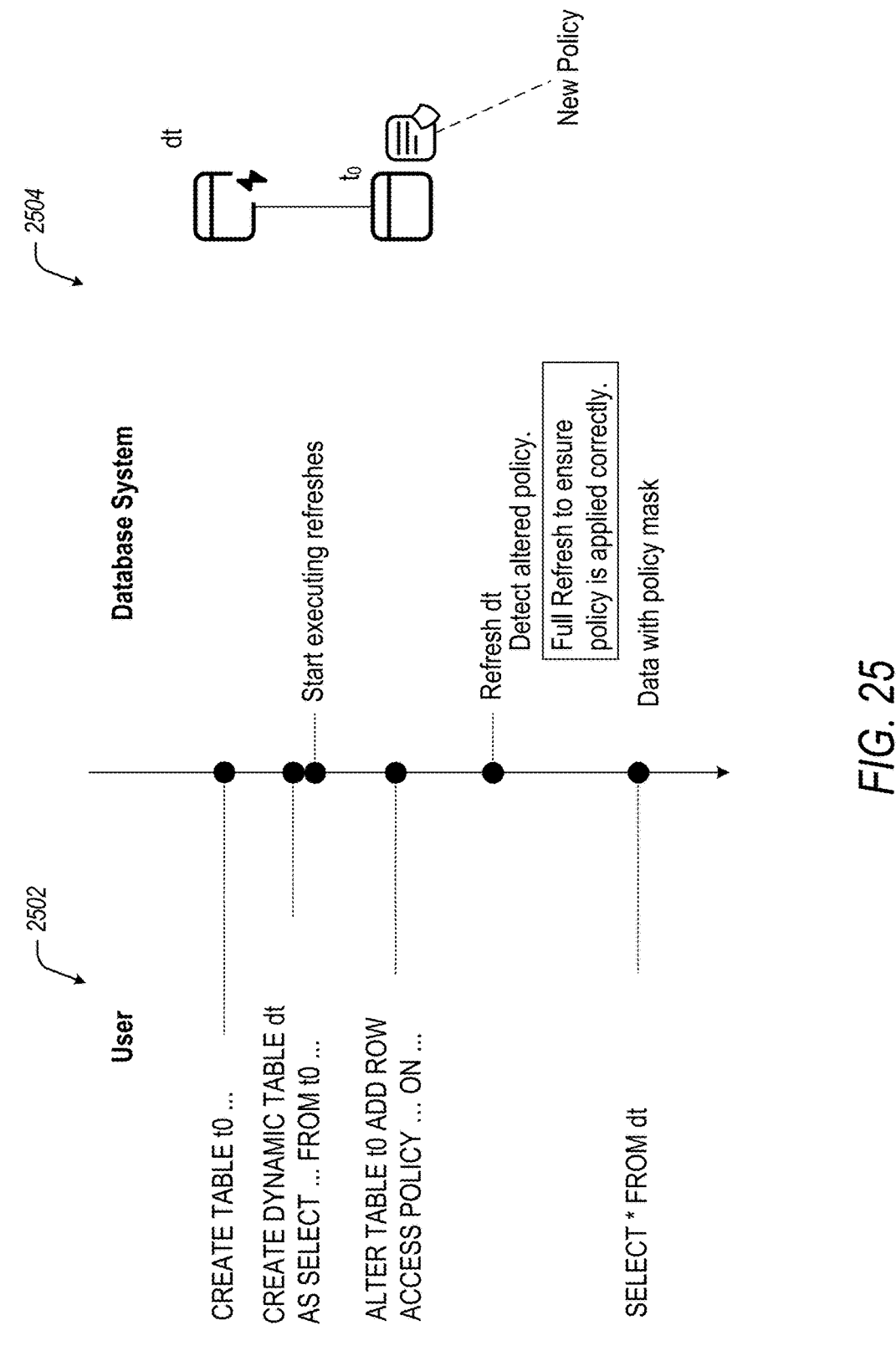
FIG. 25 is a diagram illustrating DT refresh configuration when a data access policy is added to a base object, in accordance with some embodiments of the present disclosure.

FIG. 25 is a diagram 2500 illustrating DT refresh configuration when a data access policy is added to a base object, in accordance with some embodiments of the present disclosure. Referring to FIG. 25, functionalities 2502 can be performed/configured by a user of the network-based database system 102 and can include adding a new data access policy to a base table t0 (on which dynamic table dt depends). Functionalities 2504 can be performed by the DT manager 128. Based on a base table to being updated with a new data access policy, the DT manager 128 can automatically perform a full refresh of the dynamic table to ensure the data access policy from the base table is correctly applied to the dynamic table dt.

Figure 26:
FIG. 26 is a flow diagram illustrating the operations of a database system in performing a method for configuring automatic evolution of a dynamic table, in accordance with some embodiments of the present disclosure.
Figure 26:
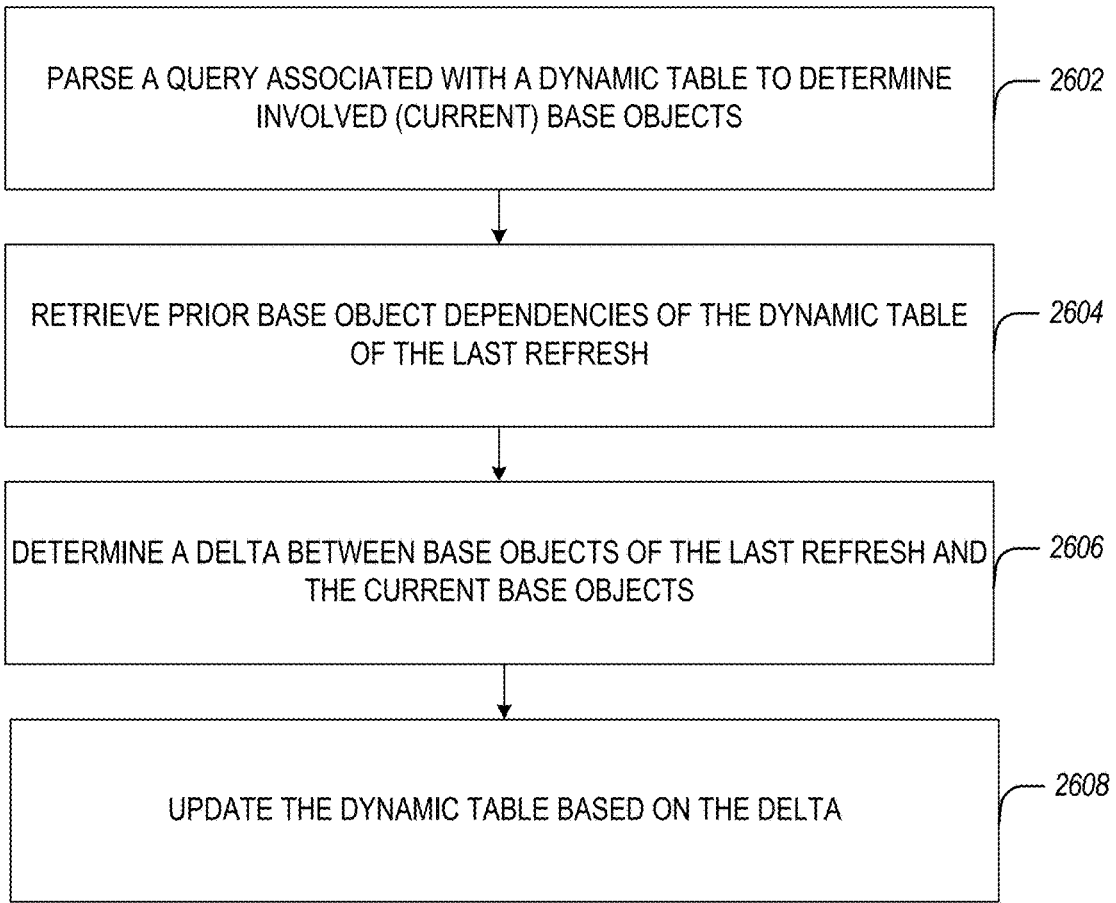

FIG. 26 is a flow diagram illustrating the operations of a database system in performing a method 2600 for configuring automatic evolution of a dynamic table, in accordance with some embodiments of the present disclosure. Method 2600 may be embodied in computer-readable instructions for execution by one or more hardware components (e.g., one or more processors) such that the operations of method 2600 may be performed by components of network-based database system 102, such as components of the compute service manager 108 (e.g., the DT manager 128 which can be configured as compiler 2110) and/or the execution platform 110 (which components may be implemented as machine 2700 of FIG. 21). Accordingly, method 2600 is described below, by way of example with reference thereto. However, it shall be appreciated that method 2600 may be deployed on various other hardware configurations and is not intended to be limited to deployment within the network-based database system 102.

In some aspects, the DT manager 128 can determine prior dependencies 2102 at a time instance before a current time instance. As described above, the prior dependencies can include base object dependencies 2106 and column dependencies 2108. In some aspects, the DT manager 128 can also determine current dependencies 2104, which can include current base object dependencies 2112 and current column dependencies 2113.

At operation 2602, the DT manager 128 can parse a query associated with a dynamic table (e.g., dt1) to determine involved (e.g., current) base objects. In some aspects, the DT manager 128 determines a current base object dependency of the dynamic table on at least a first base object (e.g., current dependencies 2104).

At operation 2604, the DT manager 128 retrieves prior base object dependencies of the DT of the last refresh. In some aspects, the DT manager 128 retrieves a prior base object dependency of the dynamic table on at least a second base object. For example, the DT manager 128 can retrieve the prior dependencies 2102 (e.g., can retrieve one or both of base object dependencies 2106 and column dependencies 2108).

At operation 2606, the DT manager 128 determines a delta between the base objects of the last refresh and the current base objects. In some aspects, the DT manager 128 determines a delta between different versions of the same base objects (e.g., different base object versions available at different refreshes). In some aspects, the DT manager 128 determines a delta between data stored by the at least first base object and data stored by the at least second base object (e.g., one or both of a first delta between base object dependencies 2106 and 2112 and a second delta between column dependencies 2108 and 2113).

At operation 2608, the DT manager 128 updates the dynamic table based on the delta. For example, the DT manager 128 uses one or both of the first delta and the second delta to apply query evolution to the DT (e.g., apply any column additions or column deletions to the DT dt1 based on one or both of the deltas). In some aspects, the DT manager 128 can determine to perform a full DT reinitialization based on one or both of the determined deltas (e.g., when an entire base object is dropped, a new base object is added, and a data access policy is added or changed).

Figure 27:
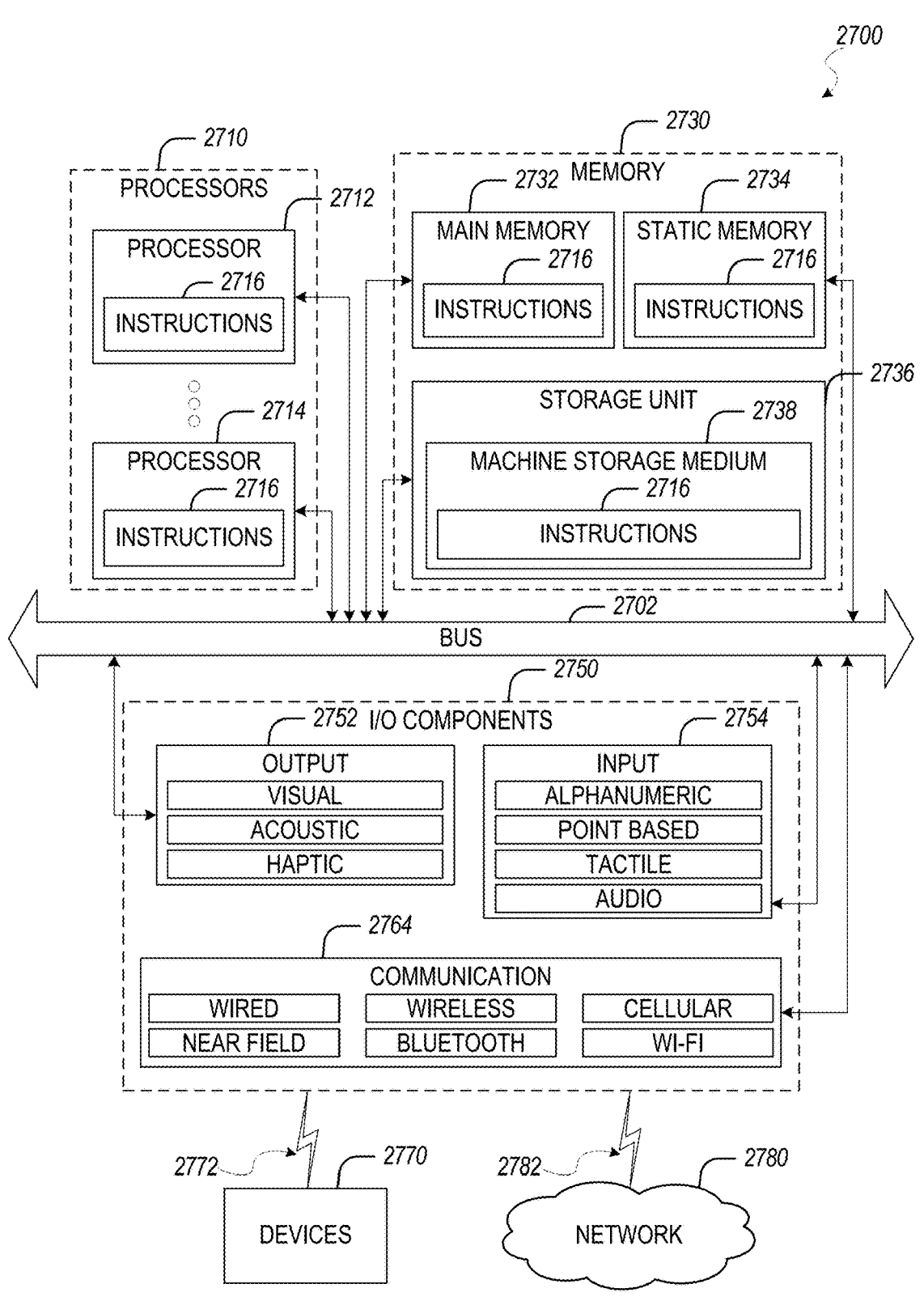
FIG. 27 illustrates a diagrammatic representation of a machine in the form of a computer system within which a set of instructions may be executed for causing the machine to perform any one or more of the methodologies discussed herein, in accordance with some embodiments of the present disclosure.

FIG. 27 illustrates a diagrammatic representation of a machine 2700 in the form of a computer system within which a set of instructions may be executed to cause the machine 2700 to perform any one or more of the methodologies discussed herein, according to an example embodiment. Specifically, FIG. 27 shows a diagrammatic representation of machine 2700 in the example form of a computer system, within which instructions 2716 (e.g., software, a program, an application, an applet, an app, or other executable code) for causing the machine 2700 to perform any one or more of the methodologies discussed herein may be executed. For example, instructions 2716 may cause machine 2700 to execute any one or more operations of method 2600 (or any other technique discussed herein, for example, in connection with FIG. 4-FIG. 26). As another example, instructions 2716 may cause machine 2700 to implement one or more portions of the functionalities discussed herein. In this way, instructions 2716 may transform a general, non-programmed machine into a particular machine 2700 (e.g., the compute service manager 108 or a node in the execution platform 110) that is specially configured to carry out any one of the described and illustrated functions in the manner described herein. In yet another embodiment, instructions 2716 may configure the compute service manager 108 and/or a node in the execution platform 110 to carry out any one of the described and illustrated functions in the manner described herein.

In alternative embodiments, the machine 2700 operates as a standalone device or may be coupled (e.g., networked) to other machines. In a networked deployment, the machine 2700 may operate in the capacity of a server machine or a client machine in a server-client network environment or as a peer machine in a peer-to-peer (or distributed) network environment. The machine 2700 may comprise, but not be limited to, a server computer, a client computer, a personal computer (PC), a tablet computer, a laptop computer, a netbook, a smartphone, a mobile device, a network router, a network switch, a network bridge, or any machine capable of executing the instructions 2716, sequentially or otherwise, that specify actions to be taken by the machine 2700. Further, while only a single machine 2700 is illustrated, the term "machine" shall also be taken to include a collection of machines 2700 that individually or jointly execute the instructions 2716 to perform any one or more of the methodologies discussed herein.

Machine 2700 includes processors 2710, memory 2730, and input/output (I/O) components 2750 configured to communicate with each other, such as via a bus 2702. In some example embodiments, the processors 2710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 2712 and a processor 2714 that may execute the instructions 2716. The term "processor" is intended to include multi-core processors 2710 that may comprise two or more independent processors (sometimes referred to as "cores") that may execute instructions 2716 contemporaneously. Although FIG. 27 shows multiple processors 2710, machine 2700 may include a single processor with a single core, a single processor with multiple cores (e.g., a multi-core processor), multiple processors with a single core, multiple processors with multiple cores, or any combination thereof.

The memory 2730 may include a main memory 2732, a static memory 2734, and a storage unit 2736, all accessible to the processors 2710 such as via the bus 2702. The main memory 2732, the static memory 2734, and the storage unit 2736 store the instructions 2716, embodying any one or more of the methodologies or functions described herein. The instructions 2716 may also reside, wholly or partially, within the main memory 2732, within the static memory 2734, within machine storage medium 2738 of the storage unit 2736, within at least one of the processors 2710 (e.g., within the processor's cache memory), or any suitable combination thereof, during execution thereof by the machine 2700.

The I/O components 2750 include components to receive input, provide output, produce output, transmit information, exchange information, capture measurements, and so on. The specific I/O components 2750 that are included in a particular machine 2700 will depend on the type of machine. For example, portable machines such as mobile phones will likely include a touch input device or other such input mechanisms, while a headless server machine will likely not include such a touch input device. It will be appreciated that the I/O components 2750 may include many other components that are not shown in FIG. 27. The I/O components 2750 are grouped according to functionality merely for simplifying the following discussion and the grouping is in no way limiting. In various example embodiments, the I/O components 2750 may include output components 2752 and input components 2754. The output components 2752 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 2754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures or other tactile input components), audio input components (e.g., a microphone), and the like.

Communication may be implemented using a wide variety of technologies. The I/O components 2750 may include communication components 2764, operable to couple the machine 2700 to a network 2780 or devices 2770 via a coupling 2782 and a coupling 2772, respectively. For example, communication components 2764 may include a network interface component or another device that can interface with network 2780. In further examples, communication components 2764 may include wired communication components, wireless communication components, cellular communication components, and other communication components to provide communication via other modalities. The device 2770 may be another machine or any of a wide variety of peripheral devices (e.g., a peripheral device coupled via a universal serial bus (USB)). For example, as noted above, machine 2700 may correspond to any one of the compute service manager 108 or the execution platform 110, and device 2770 may include the client device 114 or any other computing device described herein as being in communication with the network-based database system 102 or the cloud storage platform 104.

The various memories (e.g., 2730, 2732, 2734, and/or memory of the processor(s) 2710 and/or the storage unit 2736) may store one or more sets of instructions 2716 and data structures (e.g., software) embodying or utilized by any one or more of the methodologies or functions described herein. These instructions 2716, when executed by the processor(s) 2710, cause various operations to implement the disclosed embodiments.

As used herein, the terms "machine-storage medium," "device-storage medium," and "computer-storage medium" mean the same thing and may be used interchangeably in this disclosure. The terms refer to single or multiple storage devices and/or media (e.g., a centralized or distributed database and/or associated caches and servers) that store executable instructions and/or data. The terms shall accordingly be taken to include, but not be limited to, solid-state memories and optical and magnetic media, including memory internal or external to processors. Specific examples of machine-storage media, computer-storage media, and/or device-storage media include non-volatile memory, including by way of example, semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 2780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, network 2780 or a portion of network 2780 may include a wireless or cellular network, and the coupling 2782 may be a Code Division Multiple Access (CDMA) connection, a Global System for Mobile communications (GSM) connection, or another type of cellular or wireless coupling. In this example, the coupling

2782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 2716 may be transmitted or received over network 2780 using a transmission medium via a network interface device (e.g., a network interface component included in the communication components 2764) and utilizing any one of several well-known transfer protocols (e.g., hypertext transfer protocol (HTTP)). Similarly, instructions 2716 may be transmitted or received using a transmission medium via coupling 2772 (e.g., a peer-to-peer coupling) to device 2770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 2716 for execution by the machine 2700 and includes digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the disclosed methods may be performed by one or more processors. The performance of certain operations may be distributed among the one or more processors, not only residing within a single machine but also deployed across several machines. In some example embodiments, the processor or processors may be located in a single location (e.g., within a home environment, an office environment, or a server farm), while in other embodiments, the processors may be distributed across several locations.

Described implementations of the subject matter can include one or more features, alone or in combination, as illustrated below by way of examples.

Example 1 is a system comprising at least one hardware processor and at least one memory storing instructions that cause the at least one hardware processor to perform operations comprising: parsing a query associated with a dynamic table to determine a current base object dependency of the dynamic table on at least a first base object; retrieving a prior base object dependency of the dynamic table on at least a second base object; determining a delta between data stored by the at least first base object and data stored by the at least second base object; and updating the dynamic table based on the delta.

In Example 2, the subject matter of Example 1 includes functionalities such as creating the dynamic table using a table definition, the table definition comprising the query and a lag duration value, the lag duration value indicating a maximum time period that a result of a prior refresh of the query lags behind a current time instance.

In Example 3, the subject matter of Examples 1-2 includes functionalities such as detecting at least a second query associated with the dynamic table; and prior to the updating, causing execution of the at least second query based on data of the dynamic table.

In Example 4, the subject matter of Examples 1-3 includes functionalities such as detecting the at least first base object includes a first version of one or more directly referenced base objects or one or more indirectly referenced base objects.

In Example 5, the subject matter of Example 4 includes functionalities such as detecting the at least second base object includes a second version of the one or more directly referenced base objects or the one or more indirectly referenced base objects, wherein the second version is generated after the first version.

In Example 6, the subject matter of Example 5 includes functionalities such as determining the second version is generated based on adding, dropping, or renaming a table column of the one or more directly referenced base objects or the one or more indirectly referenced base objects; and performing the updating based on adding, dropping, or renaming the table column in the dynamic table.

In Example 7, the subject matter of Examples 5-6 includes functionalities such as determining the second version is generated based on dropping a base table from the one or more directly referenced base objects or the one or more indirectly referenced base objects and suspending a refresh of the dynamic table based on the dropping of the base table.

In Example 8, the subject matter of Examples 5-7 includes functionalities such as determining the second version is generated based on an application of an access policy to at least one of the one or more directly referenced base objects or the one or more indirectly referenced base objects; and performing a full refresh of the dynamic table based on the application of the access policy.

In Example 9, the subject matter of Examples 1-8 includes functionalities where the at least first base object and the at least second base object comprise at least one of a base table, a base view, and a base function.

In Example 10, the subject matter of Examples 1-9 includes functionalities such as determining a current column dependency of at least one column of the dynamic table on one or more columns of the at least first base object; retrieving a prior column dependency of the at least one column of the dynamic table on the one or more columns of the at least first base object; determining an additional delta between data stored by the one or more columns of the at least first base object between a time the current column dependency is determined and time the prior column dependency is determined; and updating the one or more columns of the dynamic table based on the additional delta.

Example 11 is a method comprising parsing, by at least one hardware processor, a query associated with a dynamic table to determine a current base object dependency of the dynamic table on at least a first base object; retrieving a prior base object dependency of the dynamic table on at least a second base object; determining a delta between data stored by the at least first base object and data stored by the at least second base object; and updating the dynamic table based on the delta.

In Example 12, the subject matter of Example 11 includes creating the dynamic table using a table definition, the table definition comprising the query and a lag duration value, the lag duration value indicating a maximum time period that a result of a prior refresh of the query lags behind a current time instance.

In Example 13, the subject matter of Examples 11-12 includes detecting at least a second query associated with the dynamic table and, prior to the updating, causing execution of the at least second query based on data of the dynamic table.

In Example 14, the subject matter of Examples 11-13 includes detecting the at least first base object includes a first version of one or more directly referenced base objects or one or more indirectly referenced base objects.

In Example 15, the subject matter of Example 14 includes detecting the at least second base object includes a second version of the one or more directly referenced base objects or the one or more indirectly referenced base objects, wherein the second version is generated after the first version.

In Example 16, the subject matter of Example 15 includes determining that the second version is generated based on adding, dropping, or renaming a table column of the one or more directly referenced base objects or the one or more indirectly referenced base objects and performing the updating based on adding, dropping, or renaming the table column in the dynamic table.

In Example 17, the subject matter of Examples 15-16 includes determining that the second version is generated based on dropping a base table from the one or more directly referenced base objects or the one or more indirectly referenced base objects and suspending a refresh of the dynamic table based on the dropping of the base table.

In Example 18, the subject matter of Examples 15-17 includes determining that the second version is generated based on an application of an access policy to at least one of the one or more directly referenced base objects or the one or more indirectly referenced base objects and performing a full refresh of the dynamic table based on the application of the access policy.

In Example 19, the subject matter of Examples 11-18 includes functionalities where the at least first base object and the at least second base object comprise at least one of a base table, a base view, and a base function.

In Example 20, the subject matter of Examples 11-19 includes determining a current column dependency of at least one column of the dynamic table on one or more columns of the at least first base object; retrieving a prior column dependency of the at least one column of the dynamic table on the one or more columns of the at least first base object; determining an additional delta between data stored by the one or more columns of the at least first base object between a time the current column dependency is determined and time the prior column dependency is determined; and updating the one or more columns of the dynamic table based on the additional delta.

Example 21 is a computer-storage medium comprising instructions that, when executed by one or more processors of a machine, configure the machine to perform operations comprising parsing a query associated with a dynamic table to determine a current base object dependency of the dynamic table on at least a first base object; retrieving a prior base object dependency of the dynamic table on at least a second base object; determining a delta between data stored by the at least first base object and data stored by the at least second base object; and updating the dynamic table based on the delta.

In Example 22, the subject matter of Example 21 includes functionalities such as creating the dynamic table using a table definition, the table definition comprising the query and a lag duration value, the lag duration value indicating a maximum time period that a result of a prior refresh of the query lags behind a current time instance.

In Example 23, the subject matter of Examples 21-22 includes functionalities such as detecting at least a second query associated with the dynamic table; and prior to the updating, causing execution of the at least second query based on data of the dynamic table.

In Example 24, the subject matter of Examples 21-23 includes functionalities such as detecting the at least first base object includes a first version of one or more directly referenced base objects or one or more indirectly referenced base objects.

In Example 25, the subject matter of Example 24 includes functionalities such as detecting the at least second base object includes a second version of the one or more directly referenced base objects or the one or more indirectly referenced base objects, wherein the second version is generated after the first version.

In Example 26, the subject matter of Example 25 includes functionalities such as determining the second version is generated based on adding, dropping, or renaming a table column of the one or more directly referenced base objects or the one or more indirectly referenced base objects; and performing the updating based on adding, dropping, or renaming the table column in the dynamic table.

In Example 27, the subject matter of Examples 25-26 includes functionalities such as determining the second version is generated based on dropping a base table from the one or more directly referenced base objects or the one or more indirectly referenced base objects and suspending a refresh of the dynamic table based on the dropping of the base table.

In Example 28, the subject matter of Examples 25-27 includes functionalities such as determining the second version is generated based on an application of an access policy to at least one of the one or more directly referenced base objects or the one or more indirectly referenced base objects; and performing a full refresh of the dynamic table based on the application of the access policy.

In Example 29, the subject matter of Examples 21-28 includes functionalities where the at least first base object and the at least second base object comprise at least one of a base table, a base view, and a base function.

In Example 30, the subject matter of Examples 21-29 includes functionalities such as determining a current column dependency of at least one column of the dynamic table on one or more columns of the at least first base object; retrieving a prior column dependency of the at least one column of the dynamic table on the one or more columns of the at least first base object; determining an additional delta between data stored by the one or more columns of the at least first base object between a time the current column dependency is determined and time the prior column dependency is determined; and updating the one or more columns of the dynamic table based on the additional delta.

Example 31 is at least one machine-readable medium including instructions that, when executed by processing circuitry, cause the processing circuitry to perform operations to implement any of Examples 1-30.

Example 32 is an apparatus comprising means to implement any of Examples 1-30.

Example 33 is a system to implement any of Examples 1-30.

Example 34 is a method to implement any of Examples 1-30.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments and other embodiments not explicitly described herein will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
at least one hardware processor; and
at least one memory storing instructions that cause the at least one hardware processor to perform operations comprising:
parsing a query associated with a dynamic table to determine a current base object dependency of the dynamic table on at least a first base object;
retrieving a prior base object dependency of the dynamic table on at least a second base object;

determining a delta between data stored by the at least first base object and data stored by the at least second base object, the prior base object dependency comprising a base view and a base table, and the current base object dependency comprising the base view being recreated and the base table being dropped; and updating the dynamic table based on the delta.

2. The system of claim 1, the operations comprising:

creating the dynamic table using a table definition, the table definition comprising the query and a lag duration value, the lag duration value indicating a maximum time period that a result of a prior refresh of the query lags behind a current time instance.

3. The system of claim 1, the operations comprising:

detecting at least a second query associated with the dynamic table; and prior to the updating, causing execution of the at least second query based on data of the dynamic table.

4. The system of claim 1, the operations comprising:

detecting the at least first base object includes a first version of one or more directly referenced base objects or one or more indirectly referenced base objects.

5. The system of claim 4, the operations comprising:

detecting the at least second base object includes a second version of the one or more directly referenced base objects or the one or more indirectly referenced base objects, wherein the second version is generated after the first version.

6. The system of claim 5, the operations comprising:

determining the second version is generated based on adding, dropping, or renaming a table column of the one or more directly referenced base objects or the one or more indirectly referenced base objects; and performing the updating based on adding, dropping, or renaming the table column in the dynamic table.

7. The system of claim 5, the operations comprising:

determining the second version is generated based on dropping a base table from the one or more directly referenced base objects or the one or more indirectly referenced base objects; and suspending a refresh of the dynamic table based on the dropping of the base table.

8. The system of claim 5, the operations comprising:

determining the second version is generated based on an application of an access policy to at least one of the one or more directly referenced base objects or the one or more indirectly referenced base objects; and performing a full refresh of the dynamic table based on the application of the access policy.

9. The system of claim 1, wherein the at least first base object and the at least second base object comprise at least one of a base table, a base view, and a base function.

10. The system of claim 1, the operations comprising:

determining a current column dependency of at least one column of the dynamic table on one or more columns of the at least first base object;

retrieving a prior column dependency of the at least one column of the dynamic table on the one or more columns of the at least first base object;

determining an additional delta between data stored by the one or more columns of the at least first base object between a time the current column dependency is determined and time the prior column dependency is determined; and updating the one or more columns of the dynamic table based on the additional delta.

11. A method comprising:

parsing, by at least one hardware processor, a query associated with a dynamic table to determine a current base object dependency of the dynamic table on at least a first base object;

retrieving a prior base object dependency of the dynamic table on at least a second base object;

determining a delta between data stored by the at least first base object and data stored by the at least second base object, the prior base object dependency comprising a base view and a base table, and the current base object dependency comprising the base view being recreated and the base table being dropped; and updating the dynamic table based on the delta.

12. The method of claim 11, further comprising:

creating the dynamic table using a table definition, the table definition comprising the query and a lag duration value, the lag duration value indicating a maximum time period that a result of a prior refresh of the query lags behind a current time instance.

13. The method of claim 11, further comprising:

detecting at least a second query associated with the dynamic table; and prior to the updating, causing execution of the at least second query based on data of the dynamic table.

14. The method of claim 11, further comprising:

detecting the at least first base object includes a first version of one or more directly referenced base objects or one or more indirectly referenced base objects.

15. The method of claim 14, further comprising:

detecting the at least second base object includes a second version of the one or more directly referenced base objects or the one or more indirectly referenced base objects, wherein the second version is generated after the first version.

16. The method of claim 15, further comprising:

determining the second version is generated based on adding, dropping, or renaming a table column of the one or more directly referenced base objects or the one or more indirectly referenced base objects; and performing the updating based on adding, dropping, or renaming the table column in the dynamic table.

17. The method of claim 15, further comprising:

determining the second version is generated based on dropping a base table from the one or more directly referenced base objects or the one or more indirectly referenced base objects; and suspending a refresh of the dynamic table based on the dropping of the base table.

18. The method of claim 15, further comprising:

determining the second version is generated based on an application of an access policy to at least one of the one or more directly referenced base objects or the one or more indirectly referenced base objects; and performing a full refresh of the dynamic table based on the application of the access policy.

19. The method of claim 11, wherein the at least first base object and the at least second base object comprise at least one of a base table, a base view, and a base function.

20. The method of claim 11, further comprising:

determining a current column dependency of at least one column of the dynamic table on one or more columns of the at least first base object;

retrieving a prior column dependency of the at least one column of the dynamic table on the one or more columns of the at least first base object;

determining an additional delta between data stored by the one or more columns of the at least first base object between a time the current column dependency is determined and time the prior column dependency is determined; and updating the one or more columns of the dynamic table based on the additional delta.

21. A computer-storage medium comprising instructions that, when executed by one or more processors of a machine, configure the machine to perform operations comprising:

parsing a query associated with a dynamic table to determine a current base object dependency of the dynamic table on at least a first base object;

retrieving a prior base object dependency of the dynamic table on at least a second base object;

determining a delta between data stored by the at least first base object and data stored by the at least second base object, the prior base object dependency comprising a base view and a base table, and the current base object dependency comprising the base view being recreated and the base table being dropped; and updating the dynamic table based on the delta.

22. The computer-storage medium of claim 21, the operations comprising:

creating the dynamic table using a table definition, the table definition comprising the query and a lag duration value, the lag duration value indicating a maximum time period that a result of a prior refresh of the query lags behind a current time instance.

23. The computer-storage medium of claim 21, the operations comprising:

detecting at least a second query associated with the dynamic table; and prior to the updating, causing execution of the at least second query based on data of the dynamic table.

24. The computer-storage medium of claim 21, the operations comprising:

detecting the at least first base object includes a first version of one or more directly referenced base objects or one or more indirectly referenced base objects.

25. The computer-storage medium of claim 24, the operations comprising:

detecting the at least second base object includes a second version of the one or more directly referenced base objects or the one or more indirectly referenced base objects, wherein the second version is generated after the first version.

26. The computer-storage medium of claim 25, the operations comprising:

determining the second version is generated based on adding, dropping, or renaming a table column of the one or more directly referenced base objects or the one or more indirectly referenced base objects; and performing the updating based on adding, dropping, or renaming the table column in the dynamic table.

27. The computer-storage medium of claim 25, the operations comprising:

determining the second version is generated based on dropping a base table from the one or more directly referenced base objects or the one or more indirectly referenced base objects; and suspending a refresh of the dynamic table based on the dropping of the base table.

28. The computer-storage medium of claim 25, the operations comprising:

determining the second version is generated based on an application of an access policy to at least one of the one or more directly referenced base objects or the one or more indirectly referenced base objects; and performing a full refresh of the dynamic table based on the application of the access policy.

29. The computer-storage medium of claim 21, wherein the at least first base object and the at least second base object comprise at least one of a base table, a base view, and a base function.

30. The computer-storage medium of claim 21, the operations comprising:

determining a current column dependency of at least one column of the dynamic table on one or more columns of the at least first base object;

retrieving a prior column dependency of the at least one column of the dynamic table on the one or more columns of the at least first base object;

determining an additional delta between data stored by the one or more columns of the at least first base object between a time the current column dependency is determined and time the prior column dependency is determined; and updating the one or more columns of the dynamic table based on the additional delta.

* * * * *